United States Patent
Lu et al.

(10) Patent No.: US 10,204,404 B2
(45) Date of Patent: Feb. 12, 2019

(54) IMAGE PROCESSING DEVICE AND IMAGE PROCESSING METHOD

(71) Applicant: SONY CORPORATION, Tokyo (JP)

(72) Inventors: Ying Lu, Tokyo (JP); Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 216 days.

(21) Appl. No.: 15/115,510

(22) PCT Filed: May 27, 2015

(86) PCT No.: PCT/JP2015/002674
§ 371 (c)(1),
(2) Date: Jul. 29, 2016

(87) PCT Pub. No.: WO2015/182134
PCT Pub. Date: Dec. 3, 2015

(65) Prior Publication Data
US 2017/0011496 A1    Jan. 12, 2017

(30) Foreign Application Priority Data

May 28, 2014  (JP) .................................. 2014-110386
Jan. 15, 2015  (JP) .................................. 2015-005838

(51) Int. Cl.
*G06T 5/00*    (2006.01)
*G06T 15/50*   (2011.01)
(Continued)

(52) U.S. Cl.
CPC ................ *G06T 5/009* (2013.01); *G06T 7/40* (2013.01); *G06T 15/50* (2013.01); *G06T 15/506* (2013.01); *G06T 19/20* (2013.01)

(58) Field of Classification Search
CPC .......... G06T 5/008; G06T 5/009; G06T 7/40; G06T 15/50; G06T 15/503; G06T 15/506; G06T 19/20; G06T 2215/16
See application file for complete search history.

(56) References Cited

U.S. PATENT DOCUMENTS

2011/0273448 A1* 11/2011 Geraci et al. ................. 345/426
2018/0033195 A1*  2/2018 Nagano et al. ......... G06T 17/20

FOREIGN PATENT DOCUMENTS

EP       2717227 A2    4/2014    ............ G06T 19/00
JP     2004-213583 A   7/2004
(Continued)

OTHER PUBLICATIONS

Mar. 20, 2018, Japanese Office Action issued for related JP application No. 2015-005838.

(Continued)

*Primary Examiner* — Andrew W Johns
(74) *Attorney, Agent, or Firm* — Paratus Law Group, PLLC

(57) ABSTRACT

There is provided an image processing device including circuitry configured to generate an image of a subject under an illumination environment based on illumination information, from subject information which is associated with illumination of the subject and from the illumination information, wherein the illumination information is acquired on the basis of a virtual illumination body within a real space.

17 Claims, 25 Drawing Sheets

(51) Int. Cl.
  *G06T 19/20* (2011.01)
  *G06T 7/40* (2017.01)

(56) References Cited

FOREIGN PATENT DOCUMENTS

| | | | |
|---|---|---|---|
| JP | 2006-313549 A | 11/2006 | |
| JP | 2009-223906 A | 10/2009 | ............. G06T 15/50 |
| JP | 2012-027745 A | 2/2012 | |
| JP | 2013-025762 A | 2/2013 | |

OTHER PUBLICATIONS

Watatani et al., Mixed Reality Representation with a Virtual Light Source based on Local Illumination, Proceedings of the 55$^{th}$ Annual Conference of the Institute of Systems, Control and Information Engineers (ISCIE), May 17-19, 2011, pp. 693-694, Osaka, Japan.
Lutz, et al., "Virtual Dunhuang Art Cave: A Cave within a Cave", Eurographics, 1999, pp. 1-10, vol. 18 No. 3, Blackwell Publishers.
Loscos, et al., "Interactive Virtual Relighting of Real Scenes", Transactions on Visualization and Computer Graphics, Oct.-Dec. 2000, pp. 1-18, vol. 6 No. 4, IEEE.
Jun. 19, 2018, Japanese Office Action issued for related JP Application No. 2015-005838.
Sep. 28, 2018, Japanese Office Action issued for related JP application No. 2015-005838.

\* cited by examiner

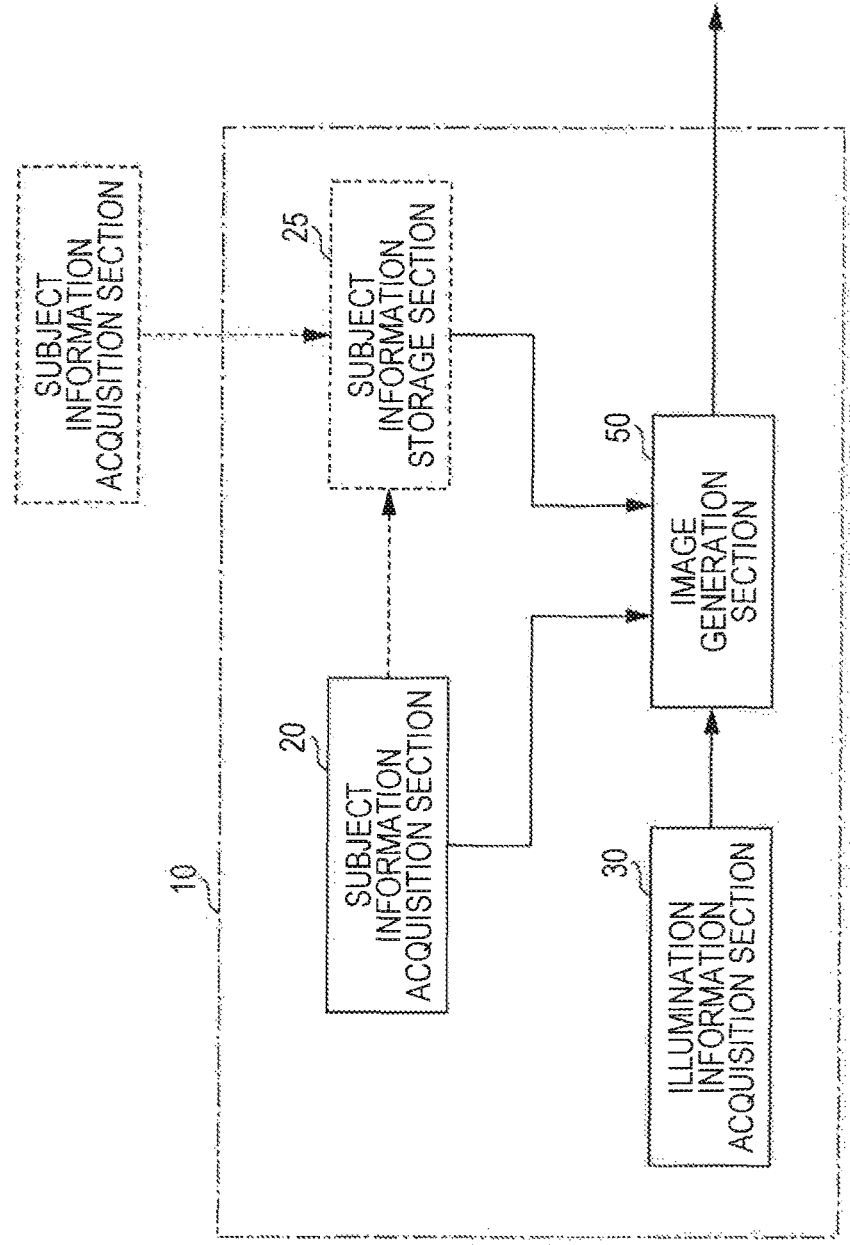

FIG. 8A
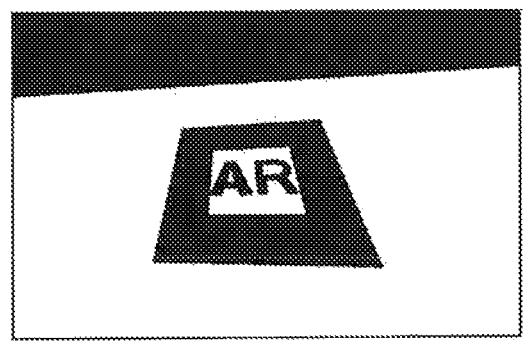
FIG. 8B
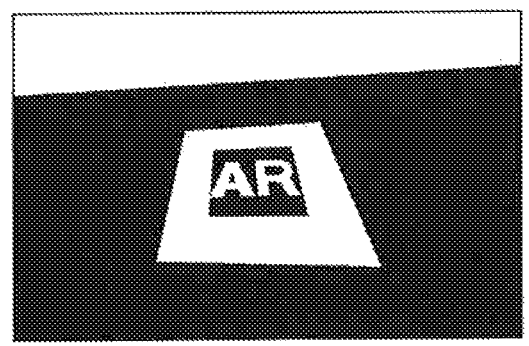
FIG. 8C
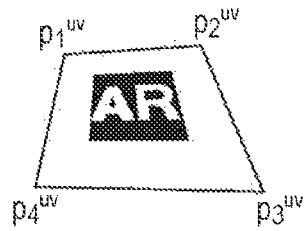
FIG. 8D
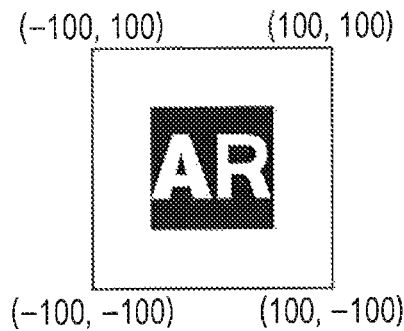

FIG. 9C
```
0,   0,   0, ···         , 0
0,   0,   0, ···         , 0
0, 255, 255, ···         , 0
⋮
```

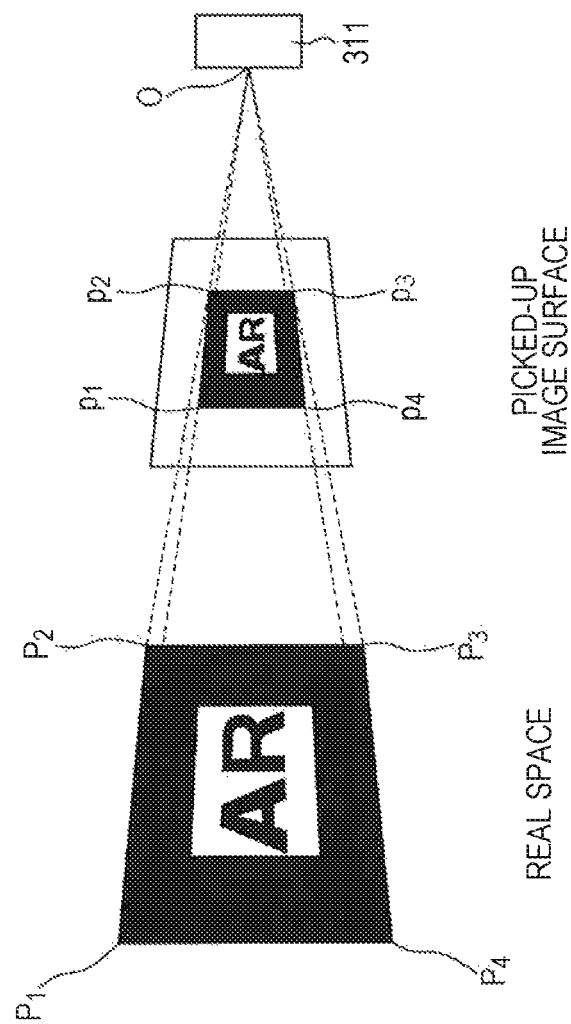

FIG. 13

| VIRTUAL ILLUMINATION BODY | ILLUMINATION ON CG SOFTWARE |
|---|---|
| THREE-DIMENSIONAL POSITION (x, y, z) IN WORLD COORDINATE SYSTEM OF REAL SPACE | THREE-DIMENSIONAL POSITION OF ILLUMINATION IN WORLD COORDINATE SYSTEM WITHIN CG SOFTWARE |
| ROTATION ANGLE AROUND X-AXIS IN WORLD COORDINATE SYSTEM OF REAL SPACE | ROTATION ANGLE OF ILLUMINATION AROUND X-AXIS IN WORLD COORDINATE SYSTEM WITHIN CG SOFTWARE |
| ROTATION ANGLE AROUND Y-AXIS IN WORLD COORDINATE SYSTEM OF REAL SPACE | ROTATION ANGLE OF ILLUMINATION AROUND Y-AXIS IN WORLD COORDINATE SYSTEM WITHIN CG SOFTWARE |
| ROTATION ANGLE AROUND Z-AXIS IN WORLD COORDINATE SYSTEM OF REAL SPACE | INTENSITY OF ILLUMINATION IN WORLD COORDINATE SYSTEM WITHIN CG SOFTWARE |

FIG. 20A
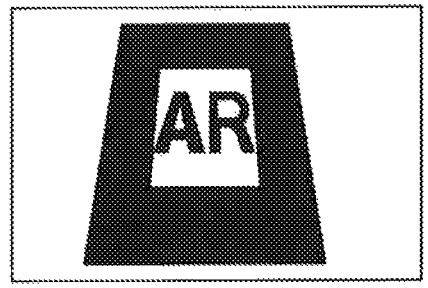
FIG. 20B
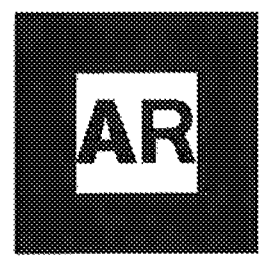
FIG. 20C
FIG. 20D
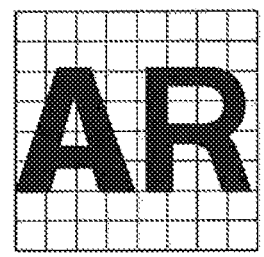
FIG. 20E
```
0,   0,   0, ···        , 0
0,   0,   0, ···        , 0
0, 255, 255, ···        , 0
⋮
```

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2015/002674 filed on May 27, 2015 under 35 U.S.C. § 371, which claims the benefit of Japanese Priority Patent Application JP 2014-110386 filed May 28, 2014, and Japanese Priority Patent Application JP 2015-005838 filed Jan. 15, 2015, the entire contents of each of which are incorporated herein by reference.

TECHNICAL FIELD

The present disclosure relates to an image processing device and an image processing method which are capable of easily setting an illumination environment when a subject image under a desired illumination environment is generated.

BACKGROUND ART

Hitherto, an image processing technique called relighting of calculating an illumination effect under an illumination environment different from that during image capture has been used in processing or the like of an image.

In relighting, subject information such as, the shape and reflection characteristics of a subject and illumination information such as, an illumination position and an illumination intensity which are associated with illumination of the subject are desired. These information items are the same as elements which are used in rendering of general three-dimensional computer graphics. In the shape of a subject, a method of the depth thereof is estimated by, for example, stereo matching using a plurality of cameras and restoring a model from sets of three-dimensional coordinates corresponding to each pixel is used. Regarding the reflection characteristics of the subject and the position of a light source, a method using the reflection of a light source in, for example, a spherical mirror is proposed.

In addition, in order to generate a suitable relighting image, for example, PTL 1 discloses a technique for automatically adjusting the intensity of a light source.

CITATION LIST

Patent Literature

[PTL 1]
Japanese Unexamined Patent Application Publication No. 2009-223906

SUMMARY

Technical Problem

Incidentally, in order to generate a desired relighting image, it may be preferable to adjust not only the intensity of the light source which is adjusted in PTL 1, but also an illumination position, an illumination direction or the like. The adjustment of the illumination position, the illumination direction or the like is performed by operating a mouse or the like while viewing a screen of a display device in, for example, computer graphics or the like. In addition, the setting of the illumination position, the illumination direction or the like is also performed by directly inputting three-dimensional coordinates or the like. However, in such a method of the related art, since it is different for a user to intuitively ascertain the illumination position, the illumination direction or the like, the arrangement of illumination in a suitable place is not facilitated.

Consequently, in the present disclosure, it is desirable to provide an image processing device and an image processing method which are capable of easily setting an illumination environment when a subject image under a desired illumination environment is generated.

Solution to Problem

According to an aspect of the present disclosure, there is provided an image processing apparatus including: circuitry configured to generate an image of a subject under an illumination environment based on illumination information, from subject information which is associated with illumination of the subject and from the illumination information, wherein the illumination information is acquired on the basis of a virtual illumination body within a real space.

According to another aspect of the present disclosure, there is provided an image processing method including: generating an image of a subject under an illumination environment based on illumination information, from subject information which is associated with illumination of the subject and from the illumination information, wherein the illumination information is acquired on the basis of a virtual illumination body within a real space.

According to another aspect of the present disclosure, there is provided a non-transitory computer-readable medium having embodied thereon a program, which when executed by a computer causes the computer to execute an image processing method, the method including: generating an image of a subject under an illumination environment based on illumination information, from subject information which is associated with illumination of the subject and from the illumination information, wherein the illumination information is acquired on the basis of a virtual illumination body within a real space.

Advantageous Effects of Invention

According to an aspect of the present disclosure, the illumination information is acquired on the basis of the virtual illumination body within the real space, and the image of the subject under an illumination environment based on the illumination information is generated from the illumination information and the subject information associated with illumination of the subject. Therefore, the setting of an illumination environment in the generation of a subject image under a desired illumination environment can be easily performed using the position, direction or the like of the virtual illumination body which is provided within the real space.

Meanwhile, effects described in the present specification are merely illustrative and are not limited, and additional effects may be present.

BRIEF DESCRIPTION OF DRAWINGS

FIG. 1 is a diagram illustrating a configuration of an image processing device.

FIG. 8A is a diagram illustrating a detection operation of an image of a marker region.

FIG. 8B is a diagram illustrating a detection operation of an image of a marker region.

FIG. 8C is a diagram illustrating a detection operation of an image of a marker region.

FIG. 8D is a diagram illustrating a detection operation of an image of a marker region.

FIG. 9C is a diagram illustrating a marker recognition operation.

FIG. 12 is a diagram illustrating a method of calculating a rotation matrix of a coordinate transformation matrix.

FIG. 13 is a diagram illustrating a correspondence relation between three-dimensional information in a real space of the marker and illumination information in a world coordinate system of computer graphics.

FIG. 20A is a diagram illustrating a learning operation.
FIG. 20B is a diagram illustrating a learning operation.
FIG. 20C is a diagram illustrating a learning operation.
FIG. 20D is a diagram illustrating a learning operation.
FIG. 20E is a diagram illustrating a learning operation.

DESCRIPTION OF EMBODIMENTS

Figure 2A:
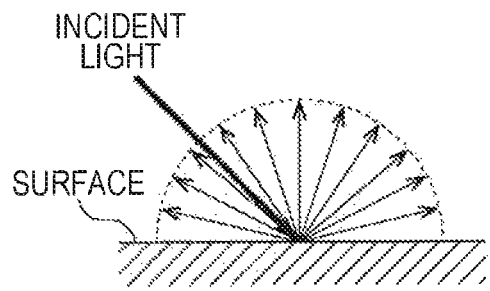
FIG. 2 is a diagram illustrating a reflection model using a bidirectional reflectance distribution function.

Hereinafter, embodiments of the present disclosure will be described. Meanwhile, the description will be given in the following order.
1. Outline of Image Processing Device
2. First Embodiment of Illumination Information Acquisition Section
3. Second Embodiment of Illumination Information Acquisition Section
4. Third Embodiment of Illumination Information Acquisition Section
5. Fourth Embodiment of Illumination Information Acquisition Section

1. Outline of Image Processing Device

FIG. 1 is a diagram illustrating a configuration of an image processing device according to the present disclosure. An image processing device 10 performs, for example, a relighting process, and generates a relighting image equivalent to a captured image when image capture is performed under an illumination environment different from that during image capture, from the captured image.

The image processing device 10 includes a subject information acquisition section 20, an illumination information acquisition section 30 and an image generation section 50.

The subject information acquisition section 20 acquires subject information. The subject information is subject information which is associated with illumination of a subject. For example, when an image of the subject is captured, a captured image to be obtained becomes a different image in a case where three-dimensional shapes or reflection characteristics of the subject are different from each other even in constant illumination. Therefore, the subject information acquisition section 20 acquires information, indicating the three-dimensional shapes, the reflection characteristics or the like of the subject, which is the subject information associated with the illumination of the subject, as subject information. When the relighting image is generated in the image generation section 50, the subject information acquisition section 20 acquires subject information from the captured image. The subject information acquisition section 20 outputs the acquired subject information to the image generation section 50.

The illumination information acquisition section 30 acquires illumination information on the basis of a virtual illumination body in a real space. The virtual illumination body is an object used when illumination information is acquired as a substitute for an illumination body that emits illumination light. The illumination information acquisition section 30 generates illumination information including information such as the three-dimensional position, illumination direction, illumination intensity, or type of illumination, on the basis of three-dimensional information in the real space of the virtual illumination body, for example, the three-dimensional position and the direction, the type of the virtual illumination body, or the like. Therefore, as the virtual illumination body, any recognizable object, for example, a planar marker, a smartphone, a user's own object, or the like can be used. Meanwhile, the illumination information may be information including at least any of the three-dimensional position, illumination direction, illumination intensity, type, and the like of illumination. The illumination information acquisition section 30 outputs the illumination information acquired on the basis of the virtual illumination body in the real space to the image generation section 50.

The image generation section 50 performs rendering or the like on the basis of the subject information which is acquired in the subject information acquisition section 20 and the illumination information which is acquired in the illumination information acquisition section 30, and generates an image of the subject under an illumination environment based on the illumination information. For example, the image generation section 50 uses the subject information which is acquired from the captured image, to thereby generate a relighting image equivalent to that in a case where an image of the subject of the captured image is captured under a new illumination environment based on the illumination information.

Next, operations of the image processing device will be described. In the acquisition of three-dimensional shapes in the subject information acquisition section 20, the image of the subject is captured using a device such as, for example, a stereo camera, a multi-view camera, an image sensor using a TOF (Time-of-Flight) method, or a 3D scanner using a structured light method. The subject information acquisition section 20 acquires three-dimensional shape information such as a depth map, a three-dimensional point cloud, or a polygon mesh from imaging results.

Figure 2B:
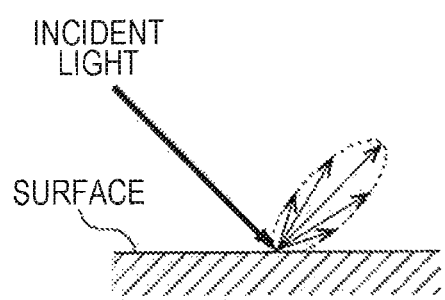
Figure 2C:
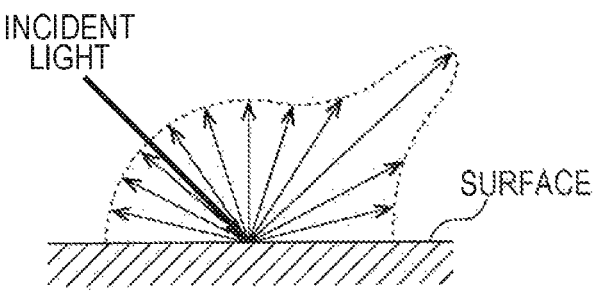

Next, the acquisition of reflection characteristics in the subject information acquisition section 20 will be described. The reflection characteristics of an object surface are characteristics indicating how the intensity of light incident on the object surface is changed and reflected, and differ depending on the material, shape, observation direction or the like of an object. As one of models for representing reflection characteristics, a bidirectional reflectance distribution function (BRDF) is known. The bidirectional reflectance distribution function is a function between the angle of incident light and the angle of emission light, and indicates that the intensity of light which is incident at a certain angle is emitted at a certain angle with at a certain degree of reflectance. Most of reflection models using the bidirectional reflectance distribution function include diffuse reflection and specular reflection as shown in FIG. 2. Meanwhile, FIG. 2(*a*) shows the reflection directions (directions of thin-line arrows) of the diffuse reflection and the intensities (lengths of thin-line arrows) of the emission light, and FIG. 2(*b*) shows the reflection directions (directions of thin-line arrows) of the specular reflection and the intensities (lengths of thin-line arrows) of the emission light. When the directions with respect to the surface normal line of the incident light and the intensities of the incident light are constant, the intensity of the emission light in the diffuse reflection remains unchanged even in a case where the emission light is reflected at a certain angle. As the emission light in the specular reflection becomes closer to the specular reflection direction, the intensity thereof becomes stronger, and the intensity becomes weaker with increasing distance from the specular reflection direction. In addition, FIG. 2(*c*) shows reflection directions (directions of thin-line arrows) inclusive of the diffuse reflection and the specular reflection and the intensities (lengths of thin-line arrows) of the emission light. Meanwhile, in order to make the description easier to understand, the reflection model of only the diffuse reflection will be described below.

As the BRDF reflection model of only the diffuse reflection, a Lambert model is widely used. In the Lambert model, as shown in Expression (1), a pixel value Id of a three primary color image is calculated on the basis of the inner product of a normal direction N of a point on the three-dimensional object surface corresponding to the pixel and a direction L of a light source, the intensity Ip of the light source and the diffuse reflectance Kd of the point.

$$Id = KdIp(N*L) \quad (1)$$

The diffuse reflectance Kd which is a parameter of the Lambert model corresponds to the reflection characteristics shown in FIG. 2(*a*), and the diffuse reflectance Kd differs greatly depending on materials or the like (for example, metal or cloth) of a subject. In addition, from the Lambert model, it can be understood that when the incident direction L and the normal direction N of light are close to each other, the pixel value Id increases. In addition, a case does not occur in which the pixel value Id is changed by the observation direction. Meanwhile, when the reflection model considering the specular reflection as well is used, as described above, the pixel value increases when the observation direction comes close to the specular reflection direction of light, and the pixel value decreases when the observation direction is distant from the specular reflection direction of light.

The diffuse reflectance Kd varies depending on wavelength, and the diffuse reflectance Kd is generally defined for each of three primary colors of red, green and blue. When the diffuse reflectance Kd on the subject surface is acquired on the basis of the Lambert model, the three primary color image and three-dimensional shape of the subject and the direction and intensity of the light source are desired, and the diffuse reflectance Kd of the object surface of each pixel can be calculated for each color by arithmetically calculating Expression (2) using the information. Meanwhile, when the light source is, for example, a point light source, the direction of the light source can be acquired by measuring the relative position of the point light source with respect to the subject by using a measure or the like during image capture. The intensity of the light source can be acquired by performing measurement using an illuminometer or the like.

$$Kd = Id/Ip(N*L) \quad (2)$$

The subject information acquisition section 20 outputs subject information, acquired by performing such processes, to the image generation section 50.

Meanwhile, the subject information acquisition section may be provided separately from the image processing device 10. In this case, the image processing device 10 is provided with a subject information storage section 25 that stores the subject information which is acquired in the subject information acquisition section.

Next, the acquisition of the illumination information in the illumination information acquisition section 30 will be described. The illumination information is information desired for performing relighting, and is information indicating setting of the position, direction, intensity, type or the like of illumination when rendering or the like is performed in the image generation section 50. The illumination information acquisition section 30 recognizes a virtual illumination body which is present in a real space, and acquires information such as the three-dimensional position and direction of the virtual illumination body in the real space. Thereafter, the illumination information acquisition section 30 converts the acquired information into the illumination information. For example, when the image processing device 10 is regarded as a subject, the positional relationship between the virtual illumination body placed at any place in the real space and the image processing device is reflected in the setting value of illumination in computer graphics (CG) such as rendering. That is, a user regards the image processing device as a subject, and illuminates this subject (image processing device) with the virtual illumination body regarded as an illumination body, so that it is possible to generate illumination information equivalent to a case where the illumination body is intuitively disposed at a desired position even when the illumination body and the subject are not actually prepared.

Here, a case will be described in which the positional relationship between the image processing device and the virtual illumination body is reflected as a three-dimensional position of illumination information in computer graphics.

Figure 3:
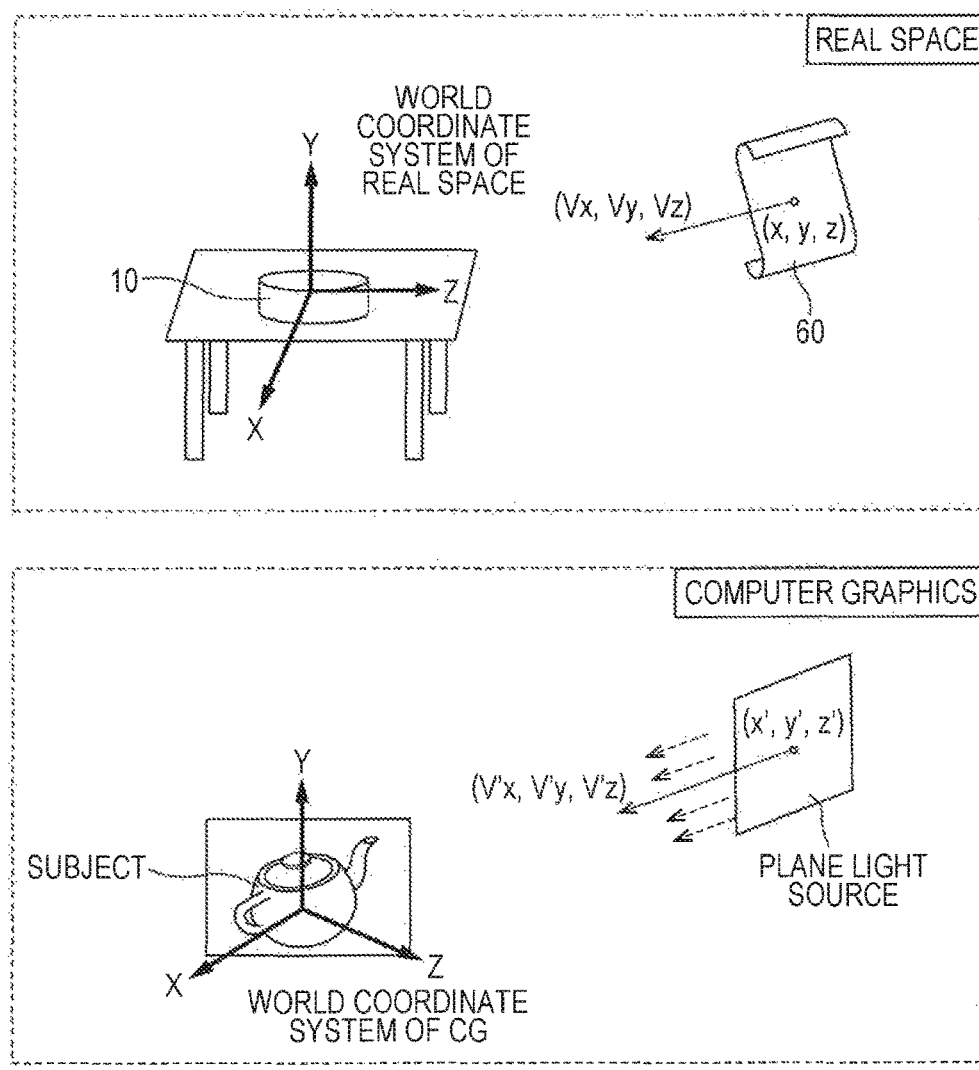
FIG. 3 is a diagram illustrating a coordinate system in a real space and a coordinate system in computer graphics.

FIG. 3 illustrates a coordinate system of a real space and a coordinate system of computer graphics. The image processing device 10 and a virtual illumination body 60 are provided in the real space. In a world coordinate system in the real space, for example, the center of the image processing device 10 is used as an origin, and the right direction, upward direction, and forward direction of the image processing device 10 are set to the X, Y, and Z-axis directions of the world coordinate system. In addition, the X, Y, and Z coordinates of three-dimensional information of the virtual illumination body in the world coordinate system in the real space are indicated by coordinate values (x, y, z), and the rotation directions are represented by (Vx, Vy, Vz).

In addition, it is assumed that a subject to be processed in which an image under a new illumination environment is generated and information relating to the location of new illumination or the like are present in the computer graphics. This information of the new illumination is obtained from the virtual illumination body which is placed in the real space. In addition, the three-dimensional shape of the subject to be processed is acquired in the subject information acquisition section 20 as described above. Therefore, in the world coordinate system in the computer graphics, for example, the center of the subject to be processed is used as an origin, and the right direction, upward direction, and forward direction of the subject to be processed are set to the X, Y, and Z-axis directions of the world coordinate system in the computer graphics. In addition, the relationship between coordinate values (x', y', z') of the new illumination in the world coordinate system of the computer graphics in the X, Y, and Z-axis directions and coordinate values (x, y, z) of the virtual illumination body in the world coordinate system of the real space in the X, Y, and Z-axis directions is set to be (x', y', z')=(x, y, z). In addition, the relation of (x', y', z')=(Jx, Jy, Jz) may be established. A coefficient "J" indicates a scale relation between the world coordinate system in the real space and the world coordinate system in the computer graphics, and is, for example, set to a predetermined value or a setting value from a user in advance.

The relationship between the direction (angle V'x around the X-axis and angle V'y around the Y-axis) of the new illumination in the world coordinate system in the computer graphics and the rotation direction (Vx, Vy, Vz) of the virtual illumination body in the world coordinate system in the real space is set to be V'x=Vx and V'Y=Vy. In this case, the three-dimensional positions of illumination which is output by the illumination information acquisition section 30 are coordinate values (x', y', z'). The angle around the X-axis in the direction of illumination is V'x, and the angle around the Y-axis is V'y.

Operations for the illumination information acquisition section 30 to acquire the intensity, type and the like of illumination from the virtual illumination body will be described later.

The image generation section 50 performs rendering on the basis of the subject information acquired in the subject information acquisition section 20 and the illumination information acquired in the illumination information acquisition section 30, and generates, for example, a relighting image.

Figure 4:
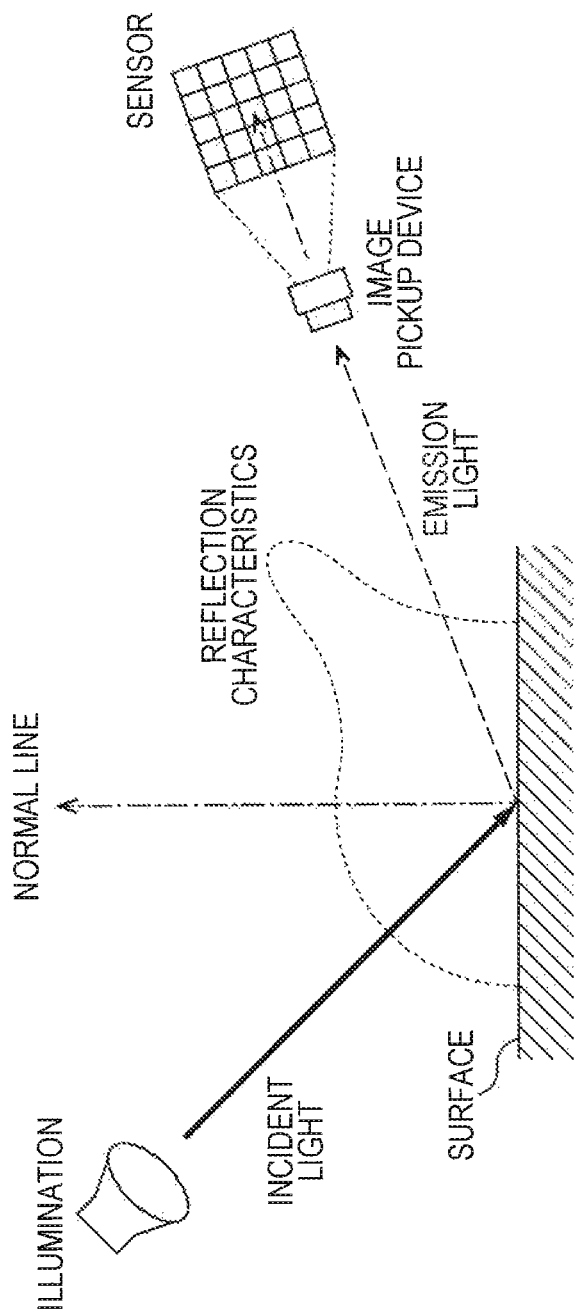
FIG. 4 is a diagram illustrating a principle of rendering.

FIG. 4 is a diagram illustrating a principle of rendering in computer graphics. When the image of an object is rendered by the computer graphics, rendering is performed on the basis of three kinds of pieces of data (three-dimensional shape, reflection characteristics of a surface, and illumination) for determining the appearance of the object. Specifically, incident light from illumination which is incident on one point on the surface of the object is reflected at an intensity determined depending on the reflection characteristics of the surface. In a sensor of an imaging device, the pixel value (signal level) of a pixel corresponding to one point of the object is determined by the intensity of emission light which is reflected light. In the computer graphics, the intensity of the incident light, the shape of the surface, and the reflection characteristics of the surface are set by a user, and thus the pixel value is automatically calculated. Similarly, in the relighting process, the three-dimensional shape and reflection characteristics of the subject and three kinds of pieces of data of illumination are also desired, and the pixel value is calculated similarly to rendering. Meanwhile, in the computer graphics, all the three kinds of pieces of data are set. However, in the relighting process, the three-dimensional shape and reflection characteristics of the subject are acquired as the subject information by the subject information acquisition section 20. Therefore, in the relighting process, a new illumination environment is set by the illumination information, and thus an image having the same composition as that during image capture but different lighting conditions is generated as a relighting image.

Meanwhile, when the subject information acquired in the subject information acquisition section 20 which is provided separately from the image processing device 10 is stored in the subject information storage section 25, the image generation section 50 performs rendering using the subject information which is stored in the subject information storage section 25.

2. First Embodiment of Illumination Information Acquisition Section

Figure 5:
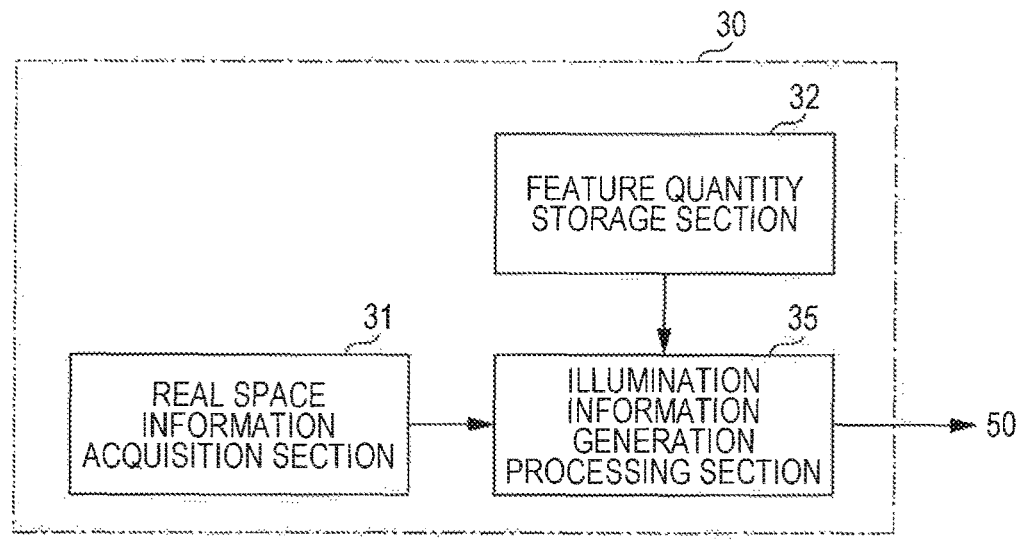
FIG. 5 is a diagram illustrating a configuration of a first embodiment of an illumination information acquisition section.

FIG. 5 illustrates a configuration of a first embodiment of the illumination information acquisition section. The illumination information acquisition section 30 includes a real space information acquisition section 31, a feature quantity storage section 32, and an illumination information generation processing section 35.

The real space information acquisition section 31 acquires information of the real space in which the virtual illumination body is placed and outputs the acquired information to the illumination information generation processing section 35. The information of the real space in which the virtual illumination body is placed is information for acquiring, for example, the three-dimensional position, direction or the like of the virtual illumination body in the real space. A feature quantity for each virtual illumination body which is set in advance is stored in the feature quantity storage section 32 in advance. The illumination information generation processing section 35 acquires information such as the three-dimensional position, direction or the like of the virtual illumination body on the basis of the feature quantity which is stored in the feature quantity storage section 32 and the information of the real space which is acquired by the real space information acquisition section 31, and converts the acquired information into the illumination information to output the converted information to the image generation section 50.

Figure 6:
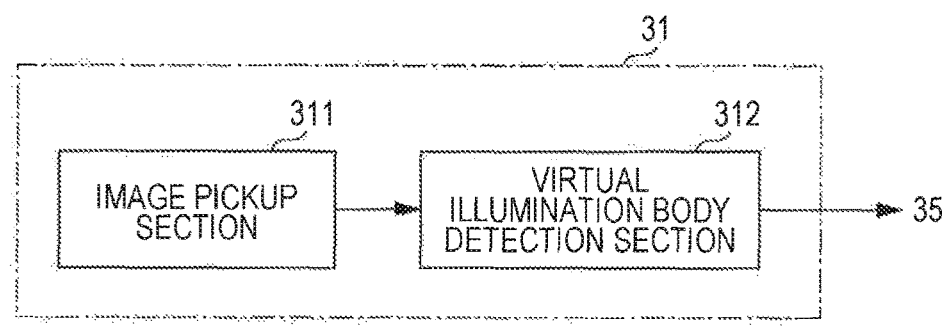
FIG. 6 is a diagram illustrating a configuration of a real space information acquisition section.

FIG. 6 illustrates a configuration of the real space information acquisition section. The real space information acquisition section 31 includes an imaging section 311 and a virtual illumination body detection section 312.

The imaging section 311 outputs a captured image of the real space in which the virtual illumination body is provided, to the virtual illumination body detection section 312.

Figure 7A:
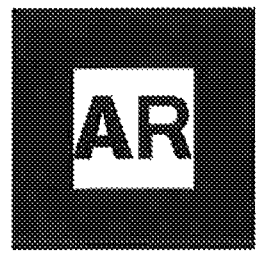
FIG. 7A is a diagram illustrating a virtual illumination body.
Figure 7B:
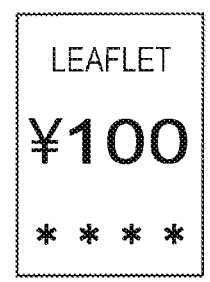
FIG. 7B is a diagram illustrating a virtual illumination body.
Figure 7C:
FIG. 7C is a diagram illustrating a virtual illumination body.
Figure 7D:
FIG. 7D is a diagram illustrating a virtual illumination body.

FIGS. 7A to 7D are diagrams illustrating a virtual illumination body, and the virtual illumination body, which is any recognizable object, may be any of a two-dimensional object or a three-dimensional object. As the two-dimensional object, a marker which is widely used in the field of augmented reality as shown in FIG. 7A, or various types of leaflets and the like as shown in FIG. 7B can be used. As the three-dimensional object, a human hand as shown in FIG. 7C, or toys and the like having a three-dimensional shape as shown in FIG. 7D can be used. Hereinafter, in order to make the present disclosure easier to understand, a case where a marker is used as the virtual illumination body will be described.

The marker which is used in ARToolKit or the like is square and is provided with a white region within a black frame, and the black frame and the white region have a predetermined ratio. The marker region is detected in the black frame, and the marker can be discriminated in accordance with a pattern within the white region. Hereinafter, a region including a pattern is set to a pattern region.

The imaging section 311 captures an image of the marker which is provided in the real space, and outputs the captured image to the virtual illumination body detection section 312.

The virtual illumination body detection section 312 detects an image of the marker region from the captured image. FIGS. 8A to 8D are diagrams illustrating a detection operation of the image of the marker region. The virtual illumination body detection section 312 converts the captured image into a grayscale image, and then generates a binary image (black-and-white image) in comparison with a threshold which is set in advance. FIG. 8A illustrates a binary image. Next, the virtual illumination body detection section 312 performs white-black reversal processing on the binary image. FIG. 8B illustrates a white-black reverse image. The virtual illumination body detection section 312 detects a white quadrangle from the reverse image as shown in FIG. 8C. The virtual illumination body detection section 312 transforms the white quadrangle into a white square as shown in FIG. 8D, using projective transformation, on the basis of the coordinates of four vertices of the white quadrangle in the reverse image. Further, the virtual illumination body detection section 312 detects whether there is the image of the marker region by comparing the lengths of horizontal and vertical sides of the black region within the white square region which is transformed. The virtual illumination body detection section 312 determines the black region to be a pattern region when the lengths are the same as each other, and determines the black region not to be a pattern region when the lengths are different from each other.

Here, a method of transforming the white quadrangle into a square using projective transformation will be described. The coordinates of the four vertices of the white quadrangle in the reverse image are set to $p_1^{uv}=(u_1, v_1)$, $p_2^{uv}=(u_2, v_2)$, $p_3^{uv}=(u_3, v_3)$, and $p_4^{uv}=(u_4, v_4)$, respectively. The length of each side of the square after the transformation can be set arbitrarily. For example, when the length of each side of the square is set to "200", the coordinates of each vertex $p_i^{uv}$ (i=1 to 4) of the quadrangle are set to (−100, 100), (100, 100), (100, −100), and (−100, −100) by a projection. This projective transformation can be expressed as Expressions (3) to (6) using a homography matrix H. Meanwhile, Expression (7) indicates the homography matrix H.

[Math. 1]

$$\begin{pmatrix} -100 \\ 100 \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_1 \\ v_1 \\ 1 \end{pmatrix} \quad (3)$$

$$\begin{pmatrix} 100 \\ 100 \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_2 \\ v_2 \\ 1 \end{pmatrix} \quad (4)$$

$$\begin{pmatrix} 100 \\ -100 \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_3 \\ v_3 \\ 1 \end{pmatrix} \quad (5)$$

$$\begin{pmatrix} -100 \\ -100 \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_4 \\ v_4 \\ 1 \end{pmatrix} \quad (6)$$

$$H = \begin{bmatrix} h_{11} & h_{12} & h_{13} \\ h_{21} & h_{22} & h_{23} \\ h_{31} & h_{32} & h_{33} \end{bmatrix} \quad (7)$$

The virtual illumination body detection section 312 calculates nine variables $h_{ij}$ of a projective transformation matrix, using a projective transformation expression shown in Expression (8). Points (u, v) of the white quadrangle transformed into points (u', v') of the white square, using the projective transformation matrix.

[Math. 2]

$$\begin{pmatrix} u' \\ v' \\ 1 \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} u \\ v \\ 1 \end{pmatrix} \quad (8)$$

Figure 9A:
FIG. 9A is a diagram illustrating a marker recognition operation.
Figure 9B:
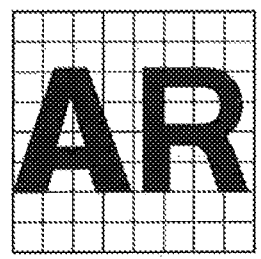
FIG. 9B is a diagram illustrating a marker recognition operation.

The illumination information generation processing section 35 performs the recognition of the marker. The illumination information generation processing section 35 compares a pattern region in the marker which is detected in the real space information acquisition section 31 with an image of a pattern region of the marker which is registered in advance, and recognizes which marker is included in the captured image. FIGS. 9A to 9C are diagrams illustrating a marker recognition operation. The real space information acquisition section 31 divides and digitizes, for example, the image of the pattern region of the detected marker, with a resolution equal to that of the image of the pattern region of the marker which is registered in advance. Meanwhile, FIG. 9A shows the image of the pattern region of the detected marker, FIG. 9B shows the division of the image, and FIG. 9C shows digitized data. The illumination information generation processing section 35 compares a digitized pattern with a digitized pattern of the marker which is stored in advance, and recognizes a marker which has the highest concordance rate and of which the concordance rate is higher than a threshold which is set in advance, as the marker which is included in the captured image.

Figure 10:
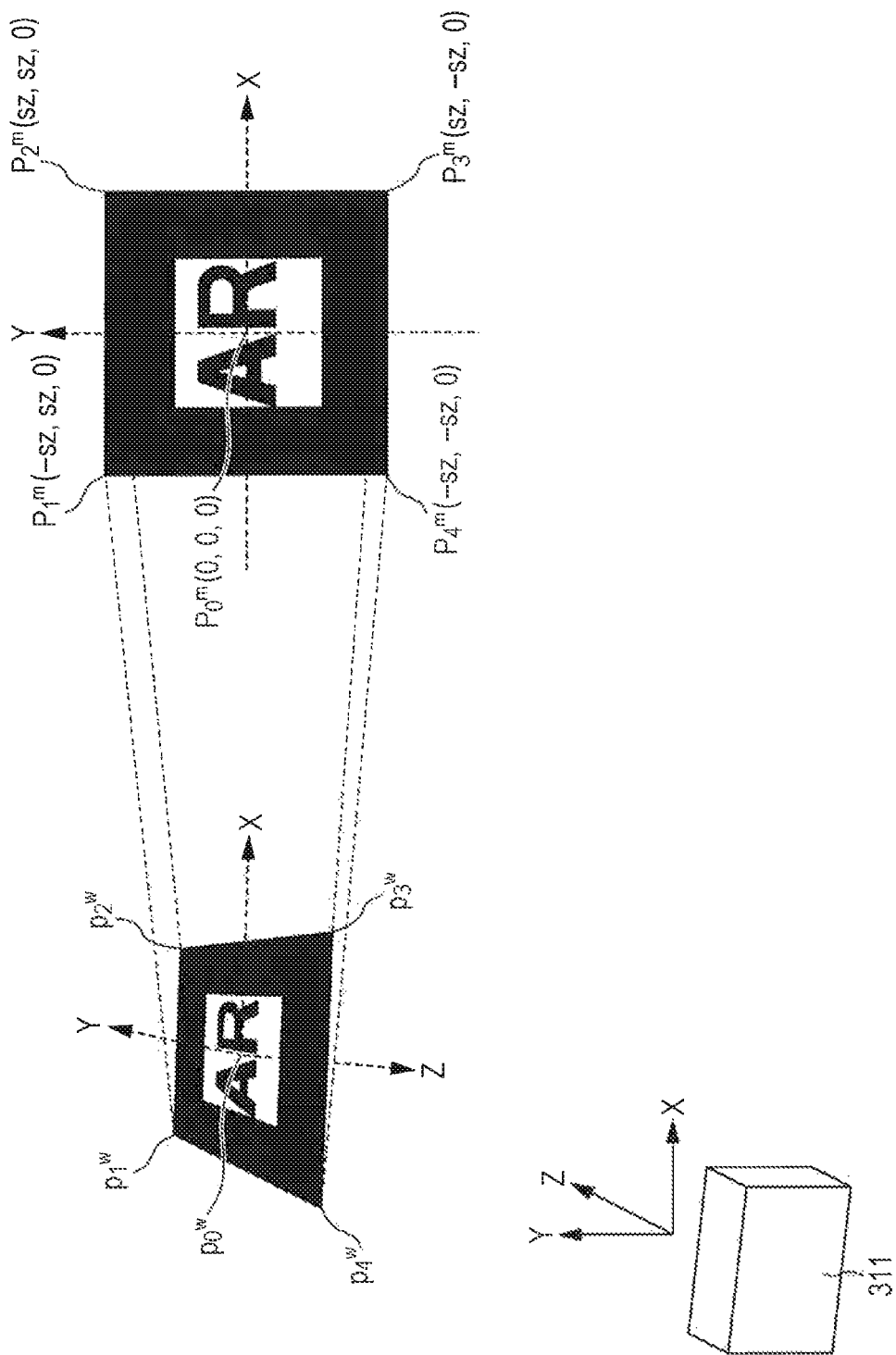
FIG. 10 is a diagram illustrating an estimation operation of three-dimensional information of the marker.

Next, the illumination information generation processing section 35 estimates three-dimensional information of the marker. FIG. 10 is a diagram illustrating an estimation operation of the three-dimensional information of the marker.

The illumination information generation processing section 35 estimates the three-dimensional information of the marker in the real space from the recognized marker and the length of one side of the square of the black frame of the marker which is stored in advance.

Figure 11:
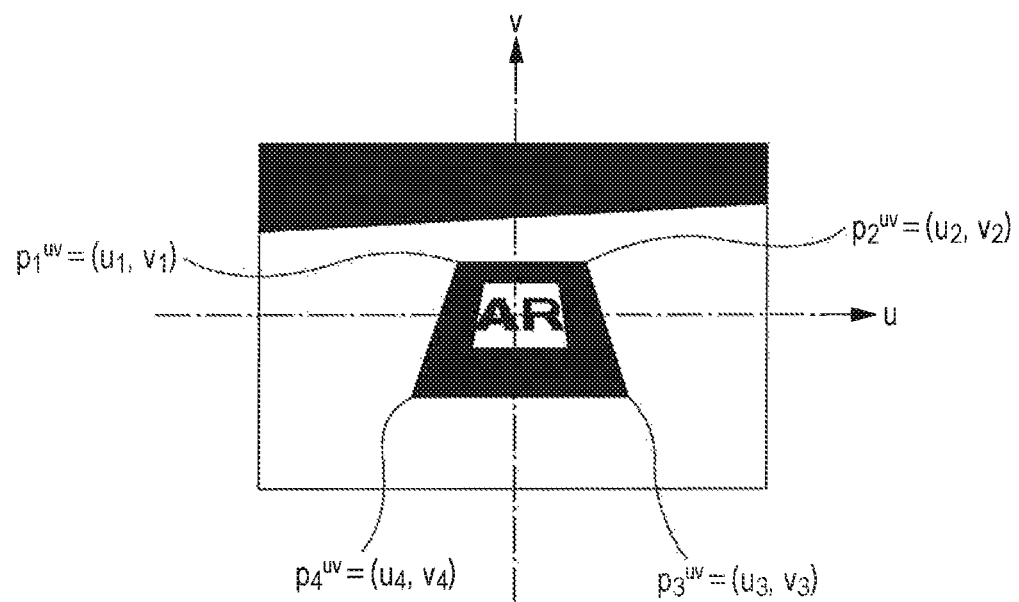
FIG. 11 is a diagram illustrating a two-dimensional image coordinate system of a captured image.

First, the definition of a coordinate system will be described. The world coordinate system in the real space is configured such that, for example, the center of the imaging device is used as an origin, and that the right direction, upward direction, and forward direction of the imaging section 311 are set to X, Y, and Z-axes. A marker coordinate system in which the center of the marker in the real space is used as an origin is also considered. The marker coordinate system is configured such that, for example, the center of the marker is used as an origin, and that the right direction and upward direction of the marker, and a direction which is perpendicular to the plane surface of the marker and indicates a rear surface are set to X, Y, and Z-axes, respectively. The two-dimensional image coordinate system of the captured image which is acquired from the imaging section 311 is configured such that, for example, as shown in FIG. 11, the center of a two-dimensional image is used as an origin, the right direction of the two-dimensional image is set to a u-axis, and that the upward direction of the two-dimensional image is set to a v-axis.

The transformation from coordinates $P^m$ ($P_x^m$, $P_y^m$, $P_z^m$) of the marker coordinate system to coordinates $P^w$ ($P_x^w$, $P_y^w$, $P_z^w$) of the world coordinate system can be expressed by coordinate transformation determinants of Expression (9). In addition, in FIG. 10, "sz" in the marker coordinate system indicates the size of "½" of the longitudinal width and transverse width of the marker.

[Math. 3]

$$\begin{bmatrix} P_x^w \\ P_y^w \\ P_z^w \\ 1 \end{bmatrix} = \begin{bmatrix} R_{3 \times 3} & T_{3 \times 3} \\ 0\ 0\ 0 & 1 \end{bmatrix} \begin{bmatrix} P_x^m \\ P_y^m \\ P_z^m \\ 1 \end{bmatrix} \quad (9)$$

The illumination information generation processing section 35 calculates a rotation matrix R and a transfer matrix T of a coordinate transformation matrix, and generates the three-dimensional information of the marker. FIG. 12 is a diagram illustrating a method of calculating the rotation matrix of the coordinate transformation matrix.

First, signs of each vertex of the marker will be described. Each vertex $p_i$ (i=1, 2, 3, 4) of the marker and the coordinates of a central point $p_0$ of the marker indicating the position of the marker in the world coordinate system are indicated by $p_i^w$ as shown in FIG. 10. In addition, each vertex $P_i$ (i=1, 2, 3, 4) of the marker and the coordinates of a central point $P_0$ of the marker indicating the position of the marker in the marker coordinate system are indicated by $P_i^m$ as shown in 10. The coordinates of a vertex $p_i$ corresponding onto the two-dimensional image of each vertex $P_i$ of the marker in the two-dimensional image coordinate system are indicated by $p_i^{uv}$ as shown in FIG. 11, and the coordinate value of the vertex $p_i$ in the world coordinate system is indicated by $p_i^w$. In FIG. 12, vertices $P_1$, $P_2$, $P_3$, and $P_4$ of the marker located on a three-dimensional space in the imaging section 311 and vertices $P_1$, $P_2$, $P_3$, and $P_4$ of the marker located on a three-dimensional space indicate vertices $p_1$, $p_2$, $p_3$, and $p_4$ of the marker which is projected onto the two-dimensional image.

When the illumination information generation processing section 35 can acquire sides $p_1p_2$, $p_2p_3$, $p_3p_4$, and $p_4p_1$ of the quadrangle of the marker in the image by recognizing the marker from the image of the marker, surfaces $Op_1p_2$, $Op_2p_3$, $Op_3p_4$, and $Op_4p_1$ through a viewpoint O of the imaging device are extended to the real space. In this case, the respective surfaces become surfaces for coupling the viewpoint O, the sides of the marker of the two-dimensional image, and the sides of the three-dimensional marker by passing through the four sides $P_1P_2$, $P_2P_3$, $P_3P_4$, and $P_4P_1$, respectively, of the marker in the real space as well.

Next, the illumination information generation processing section 35 calculates normal lines of these four surfaces. The world coordinate system is defined as described above, and the coordinate value of the viewpoint O of the imaging section 311 in the world coordinate system is an origin (0, 0, 0). The coordinates of the vertices $p_1$, $p_2$, $p_3$, and $p_4$ of the marker on a captured image surface in the world coordinate system are configured such that, since the captured image surface is the plane surface of Z=focal length (focal length f of the imaging section 311) in the world coordinate system, the Z coordinate values of the respective vertices $p_1$, $p_2$, $p_3$, and $p_4$ are also set to the focal length. In addition, the X coordinate value $p_{xi}^w$ of the vertex $p_i$ (i=1, 2, 3, 4) in the world coordinate system is set to a value obtained by multiplying a u coordinate $u_i$ of each point in the two-dimensional image coordinate system by a pixel pitch. That is, the value is set to an X coordinate value $p_{xi}^w = u_i *$pitch. Further, the Y coordinate value $p_{yi}^w$ of the vertex $p_i$ (i=1, 2, 3, 4) in the world coordinate system is set to a value obtained by multiplying a v coordinate $v_i$ of each point in the two-dimensional image coordinate system by a pixel pitch. That is, the value is set to a Y coordinate value $p_{yi}^w = v_i *$pitch. When the viewpoint O and the coordinates of the vertex $p_i$ of the marker are obtained, the surfaces $Op_1p_2$, $Op_2p_3$, $Op_3p_4$, and $Op_4p$ (that is, surfaces $Op_1P_2$, $Op_2P_3$, $Op_3P_4$, and $Op_4P_1$) can be represented by Expressions (10) to (13) in the world coordinate system.

[Math. 4]

$$N_{x12}X + N_{y12}Y + N_{z12}Z = 0 \quad (10)$$

$$N_{x23}X + N_{y23}Y + N_{z23}Z = 0 \quad (11)$$

$$N_{x34}X + N_{y34}Y + N_{z34}Z = 0 \quad (12)$$

$$N_{x41}X + N_{y41}Y + N_{z41}Z = 0 \quad (13)$$

Here, vectors (normal lines of the surfaces) perpendicular to the surfaces $Op_1p_2$, $Op_2p_3$, $Op_3p_4$, and $Op_4p_1$ can be indicated by $N_{12}=(N_{X12}, N_{Y12}, N_{Z12})$, $N_{23}=(N_{X23}, N_{Y23}, N_{Z23})$, $N_{34}=(N_{X34}, N_{Y34}, N_{Z34})$, and $N_{41}=(N_{X41}, N_{Y41}, N_{Z41})$.

Next, the illumination information generation processing section 35 calculates outer products from the normal lines (normal line $N_{12}$ of the surface $Op_1p_2$, normal line $N_{34}$ of the surface $Op_3p_4$, normal line $N_{23}$ of the surface $Op_2p_3$, and normal line $N_{41}$ of the surface $Op_4p_1$) of the opposite surfaces. The outer product is perpendicular to two normal directions, and is set to a vector indicating one axis of the marker coordinate system. Here, when the marker coordinate system of FIG. 12 is defined similarly to the marker coordinate system shown in FIG. 10, the outer product $V_x$ of the normal line $N_{12}$ of the surface $OP_1P_2$ and the normal line $N_{34}$ of the surface $OP_3P_4 = N_{12}*N_{34}$ is set to a vector indicating the X-axis of the marker coordinate system in the world coordinate system. In addition, the outer product $V_y$ of the normal line $N_{23}$ of the surface $OP_2P_3$ and the normal line $N_{41}$ of the surface $OP_4P_1 = N_{23}*N_{41}$ is set to a vector indicating the Y-axis of the marker coordinate system in the world coordinate system. Further, the outer product $V_z = V_x * V_y$ is calculated from two outer products which are calculated from the illumination information generation processing section 35. The calculated outer product $V_z$ is set to a vector indicating the Z-axis of the marker coordinate system in the world coordinate system.

The vectors $V_x$, $V_y$, and $V_z$ have a size of 3*1, and the matrix $[V_x V_y V_z]$ of 3*3 shown in Expression (14) obtained by combining these vectors side by side transversely becomes the rotation matrix R of the coordinate transformation matrix.

[Math. 5]

$$(Vx, Vy, Vz) = \begin{bmatrix} Vxx & Vyx & Vzx \\ Vxy & Vyy & Vzy \\ Vxz & Vyz & Vzz \end{bmatrix} \quad (14)$$

Next, the calculation of the transfer matrix T will be described. The illumination information generation processing section 35 calculates the remaining transfer matrix T of the coordinate transformation matrix using coordinate transformation determinants shown in Expression (9). The coordinates $P_i^m$ (i=1, 2, 3, 4) of four vertices of the marker in the marker coordinate system are set to $P_1^m=(-sz, sz, 0)$, $P_2^m=(sz, sz, 0)$, $P_3^m=(sz, -sz, 0)$, and $P_4^m=(-sz, -sz, 0)$, respectively. Meanwhile, as described above, "sz" in the marker coordinate system indicates the size of "½" of the longitudinal width and transverse width of the marker.

The X coordinate value $P_{xi}^w$ and the Y coordinate value $P_{yi}^w$ of each vertex of the marker in the world coordinate system are expressed as in the following Expressions (15) to (18) using the Z coordinate value $P_{zi}^w$ of each vertex of the marker in the world coordinate system and a position $(u_i, v_i)$ on the two-dimensional image. Meanwhile, in Expressions (15) to (18), "f" is focal length of the imaging section 311.

[Math. 6]

$$P_{x1}^w = \frac{u_1}{f} P_{z1}^w; \quad P_{y1}^w = \frac{v_1}{f} P_{z1}^w \quad (15)$$

$$P_{x2}^w = \frac{u_2}{f} P_{z2}^w; \quad P_{y2}^w = \frac{v_2}{f} P_{z2}^w \quad (16)$$

$$P_{x3}^w = \frac{u_3}{f} P_{z3}^w; \quad P_{y3}^w = \frac{v_3}{f} P_{z3}^w \quad (17)$$

$$P_{x4}^w = \frac{u_4}{f} P_{z4}^w; \quad P_{y4}^w = \frac{v_4}{f} P_{z4}^w \quad (18)$$

By substituting the coordinates of each vertex of the marker in the marker coordinate system and the coordinates thereof in the world coordinate system into Expression (3), the following Expressions (19) to (22) can be obtained.

[Math. 7]

$$\begin{pmatrix} \frac{u_1}{f} P_{z1}^w \\ \frac{v_1}{f} P_{z1}^w \\ P_{z1}^w \\ 1 \end{pmatrix} = \begin{bmatrix} R_{11} & R_{12} & R_{13} & T_{11} \\ R_{21} & R_{22} & R_{23} & T_{12} \\ R_{31} & R_{32} & R_{33} & T_{13} \\ 0 & 0 & 0 & 1 \end{bmatrix} \begin{pmatrix} -sz \\ sz \\ 0 \\ 1 \end{pmatrix} \quad (19)$$

$$\begin{pmatrix} \frac{u_2}{f} P_{z2}^w \\ \frac{v_2}{f} P_{z2}^w \\ P_{z2}^w \\ 1 \end{pmatrix} = \begin{bmatrix} R_{11} & R_{12} & R_{13} & T_{11} \\ R_{21} & R_{22} & R_{23} & T_{12} \\ R_{31} & R_{32} & R_{33} & T_{13} \\ 0 & 0 & 0 & 1 \end{bmatrix} \begin{pmatrix} sz \\ sz \\ 0 \\ 1 \end{pmatrix} \quad (20)$$

$$\begin{pmatrix} \frac{u_3}{f} P_{z3}^w \\ \frac{v_3}{f} P_{z3}^w \\ P_{z3}^w \\ 1 \end{pmatrix} = \begin{bmatrix} R_{11} & R_{12} & R_{13} & T_{11} \\ R_{21} & R_{22} & R_{23} & T_{12} \\ R_{31} & R_{32} & R_{33} & T_{13} \\ 0 & 0 & 0 & 1 \end{bmatrix} \begin{pmatrix} sz \\ -sz \\ 0 \\ 1 \end{pmatrix} \quad (21)$$

$$\begin{pmatrix} \frac{u_4}{f} P_{z4}^w \\ \frac{v_4}{f} P_{z4}^w \\ P_{z4}^w \\ 1 \end{pmatrix} = \begin{bmatrix} R_{11} & R_{12} & R_{13} & T_{11} \\ R_{21} & R_{22} & R_{23} & T_{12} \\ R_{31} & R_{32} & R_{33} & T_{13} \\ 0 & 0 & 0 & 1 \end{bmatrix} \begin{pmatrix} -sz \\ -sz \\ 0 \\ 1 \end{pmatrix} \quad (22)$$

In four coordinate transformation determinants, seven unknown quantities are present, in total, in the Z coordinates $P_{zi}^w$ of four vertices of the marker in the world coordinate system and the transfer matrices $(T_{11}, T_{12}, T_{13})^T$. In addition, there are three equations in one coordinate transformation determinant, and there are the total of twelve equations in four coordinate transformation determinants. Therefore, by calculating seven unknown quantities using these equations, the illumination information generation processing section 35 calculates the transfer matrix T of the coordinate transformation matrix.

Here, regarding the rotation matrix R and the transfer matrix T, a relationship with the three-dimensional information of the marker will be described. In the world coordinate system, the coordinate value $(P_{x0}^w, P_{y0}^w, P_{z0}^w)$ of the center of the marker which is indicated by the three-dimensional position of the three-dimensional information of the marker is $(P_{x0}^w, P_{y0}^w, P_{z0}^w)=(T_{11}, T_{12}, T_{13})$ similarly to the transfer matrix $T=(T_{11}, T_{12}, T_{13})$. The rotation direction thereof is the same as that of the rotation matrices $R=(R_{11}, R_{12}, R_{13}; R_{21}, R_{22}, R_{23}; R_{31}, R_{32}, R_{33})$. Alternatively, the rotation direction becomes a rotation direction which is transformed by the illumination information generation processing section 35 from the rotation matrix R of 3*3 to an XYZ Euler angle R around the X-axis, the Y-axis, and the Z-axis=($R_x$, $R_y$, $R_z$).

The illumination information generation processing section 35 transforms the three-dimensional information of the marker obtained by performing such processes into illumination information. The correspondence relation between the three-dimensional information of the marker and the illumination information is set in advance, and the illumination information generation processing section 35 performs the transformation from the three-dimensional information of the marker to the illumination information on the basis of the correspondence relation. FIG. 13 is a diagram illustrating a correspondence relation between the three-dimensional information of the marker in the real space and the illumination information of computer graphics in the world coordinate system. The rotation angle around the X-axis of the marker in the world coordinate system of the real space corresponds to the rotation angle around the X-axis of illumination in the world coordinate system of the computer graphics. In addition, the rotation angle around the Y-axis of the marker in the world coordinate system of the real space corresponds to the rotation angle around the Y-axis of the illumination in the world coordinate system of the computer graphics. Further, the rotation angle around the Z-axis of the marker in the world coordinate system of the real space corresponds to the intensity of the illumination in the world coordinate system of the computer graphics. A method of performing transformation from the three-dimensional information of the marker to the illumination information differs depending on the definition of the world coordinate system of the computer graphics. For example, in the world coordinate system of the computer graphics, when the center of a subject to be relit is used as an origin as shown in FIG. 3, the three-dimensional coordinates (x', y', z') of the illumination are set to be K times the coordinate values ($P_{xo}^w$, $P_{yo}^w$, $P_{zo}^w$) of the three-dimensional coordinates of the marker in the real space, that is, (x', y', z')=($KP_{xo}^w$, $KP_{yo}^w$, $KP_{zo}^w$). Meanwhile, "K" indicates a scale relation between the world coordinate system in the real space and the world coordinate system in the computer graphics, and is set to a predetermined value or is changeably set in advance by a user.

Here, in the world coordinate system in the computer graphics, it is assumed that the center of a subject to be relit is used as an origin, and the world coordinate system in the computer graphics and the world coordinate system in the real space are the same left-handed coordinate system. In this case, the rotation directions around the X and Y-axes of the marker in the real space become the rotation directions around the X and Y-axes which are directions of illumination without change. In addition, when the origin of the world coordinate system in the computer graphics is not the center of the subject to be relit, it is necessary to perform transformation from the three-dimensional coordinates and rotation directions of the marker to the three-dimensional coordinates and rotation direction of the illumination in the world coordinate system of the computer graphics, in consideration of the three-dimensional coordinates and rotation directions of the subject to be relit in the world coordinate system of the computer graphics. For example, in the world coordinate system of the computer graphics, the three-dimensional position and rotation angle of the center of the subject to be relit are set to Tobject and Robject, respectively. In this case, the three-dimensional coordinates T' and rotation directions R' of the illumination in the world coordinate system of the computer graphics are transformed as in Expression (23).

[Math. 8]

$$\begin{bmatrix} R' & T' \\ 0\ 0\ 0 & 1 \end{bmatrix} = \begin{bmatrix} R_{object} & T_{object} \\ 0\ 0\ 0 & 1 \end{bmatrix} \cdot \begin{bmatrix} R & T \\ 0\ 0\ 0 & 1 \end{bmatrix} \quad (23)$$

Regarding a change in the intensity of illumination, for example, the intensity is weakened when the rotation direction around the Z-axis of the marker in the real space is a clockwise direction, and the intensity is weakened when the rotation direction is an anticlockwise direction.

Figure 14:
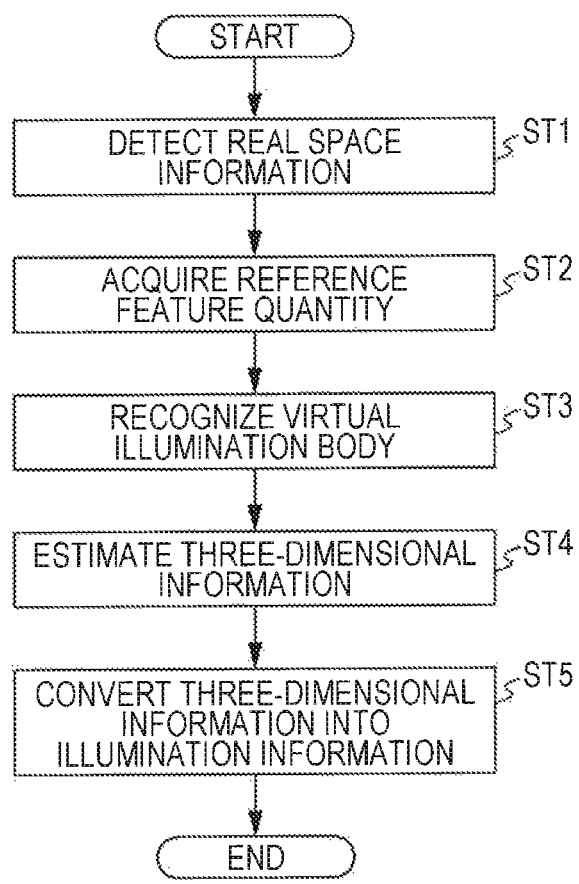
FIG. 14 is a flow diagram illustrating operations of the first embodiment.

FIG. 14 is a flow diagram illustrating operations of the first embodiment. In step ST1, the illumination information acquisition section 30 detects information of the real space. The illumination information acquisition section 30 detects the information of the real space in which the virtual illumination body is placed.

Figure 15:
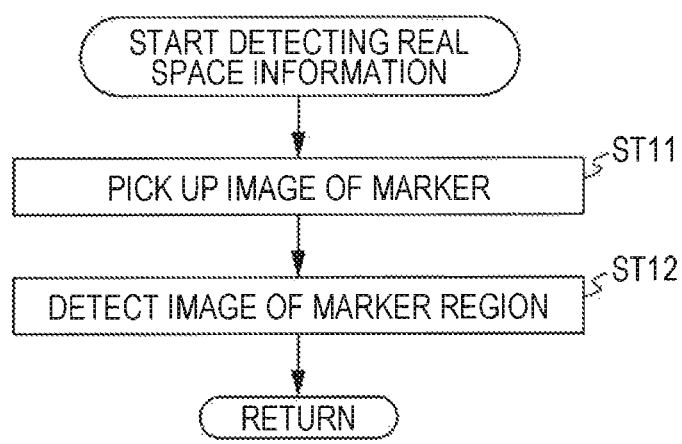
FIG. 15 is a flow diagram illustrating a detection operation of real space information.

FIG. 15 is a flow diagram illustrating a detection operation of the information of the real space. In step ST11, the illumination information acquisition section 30 captures an image of the marker. The illumination information acquisition section 30 captures the image of the marker which is a virtual illumination body, and the process proceeds to step ST12.

In step ST12, the illumination information acquisition section 30 detects an image of the marker region. The illumination information acquisition section 30 performs a process of generating a binary image, as described above, on the captured image which is generated in step ST11, a process of detecting an image of a quadrangular subject region including a region corresponding to the marker, for example, a frame region having a predetermined ratio, and the like. The illumination information acquisition section 30 detects the image of the marker region by performing such processes.

Referring back to FIG. 14, the illumination information acquisition section 30 acquires a reference feature quantity in step ST2. The illumination information acquisition section 30 acquires the reference feature quantity which is a pattern file generated and stored in advance for each marker, from a memory or the like, and the process proceeds to step ST3. Meanwhile, the reference feature quantity is a pattern file obtained by dividing the pattern region of the marker with a predetermined resolution for each marker and digitizing an image for each divided region.

In step ST3, the illumination information acquisition section 30 performs a recognition process on the virtual illumination body. The illumination information acquisition section 30 generates a pattern file which is a feature quantity by dividing the image of the pattern region except for the image of the frame region, with a resolution equal to that during the calculation of the reference feature quantity, from the image of the marker region which is detected in step ST1, and digitizing an image for each divided region. The illumination information acquisition section 30 collates this feature quantity (pattern file) with the reference feature quantity (pattern file) which is acquired in step ST2, and discriminates a marker having a reference feature quantity which is most analogous to the detected marker. The illumination information acquisition section 30 recognizes a marker having a reference feature quantity which is most analogous to the detected marker as the virtual illumination body, and the process proceeds to step ST4.

In step ST4, the illumination information acquisition section 30 estimates the three-dimensional information. The illumination information acquisition section 30 estimates the three-dimensional information of the virtual illumination body in the real space.

Figure 16:
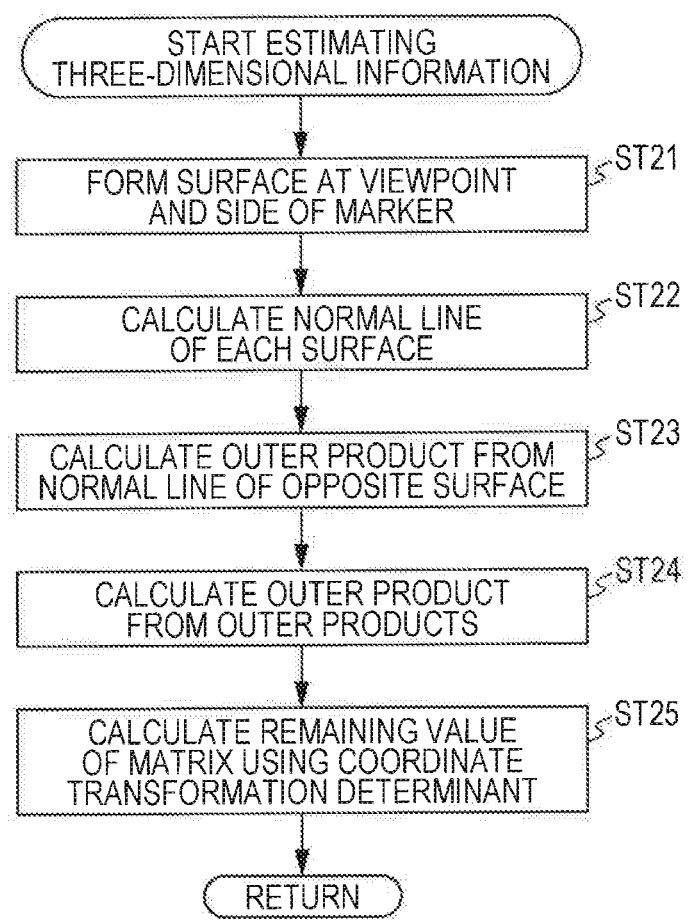
FIG. 16 is a flow diagram illustrating an estimation operation of three-dimensional information.

FIG. 16 is a flow diagram illustrating an estimation operation of the three-dimensional information. In step ST21, the illumination information acquisition section 30 form surfaces at the viewpoint and the sides of the marker. As described with reference to FIG. 12, the illumination information acquisition section 30 forms the surfaces for coupling the viewpoint O, the sides of the marker of the two-dimensional image, and the sides of the three-dimensional marker, and the process proceeds to step ST22.

In step ST22, the illumination information acquisition section 30 calculates a normal line of each surface. The illumination information acquisition section 30 calculates the normal line for each surface which is formed in step ST21, and the process proceeds to step ST23.

In step ST23, the illumination information acquisition section 30 calculates outer products from the normal lines of the opposite surfaces. The illumination information acquisition section 30 calculates outer products the normal lines of the opposite surfaces to thereby acquire the vector indicating the X-axis and the vector indicating the Y-axis of the marker coordinate system, for example, as described above, and the process proceeds to step ST24.

In step ST24, the illumination information acquisition section 30 calculates an outer product from the outer products. The illumination information acquisition section 30 calculates the outer product between the outer products which are calculated from the normal lines of the opposite surfaces to thereby acquire the vector indicating the Z-axis of the marker coordinate system, for example, as described above, and the process proceeds to step ST25. Meanwhile, the processes of step ST21 to step ST24 are equivalent to the estimation of the rotation matrix R of the coordinate transformation matrix.

In step ST25, the illumination information acquisition section 30 calculates the remaining values of the matrix using coordinate transformation determinants. The illumination information acquisition section 30 estimates the three-dimensional information by calculating the remaining values of the matrix similarly to the calculation of the transfer matrix T described above.

Referring back to FIG. 14, the illumination information acquisition section 30 transforms the three-dimensional information into illumination information in step ST5. The illumination information acquisition section 30 sets a correspondence relation between the three-dimensional information of the marker and the illumination information in advance, and transforms the three-dimensional information which is estimated in step ST4 into the illumination information which is used in the image generation section 50.

Incidentally, in the aforementioned embodiment, a case is described in which the illumination position (three-dimensional coordinates), illumination direction and illumination intensity of the illumination information are set using one type of marker, and a change in the type of illumination is not performed. Consequently, when the type of illumination is changed, the illumination information may be generated using a marker corresponding to the type of illumination. For example, a marker A is set to illumination of a white point light source in advance, and a marker B is set to illumination of a yellow plane light source in advance. Here, when the marker A is recognized in the illumination information generation processing section 35, the white point light source is used as illumination and thus the illumination information is generated. In addition, when the marker A and the marker B are recognized, the white point light source and the yellow plane light source are used as illumination and thus the illumination information is generated.

Figure 17:
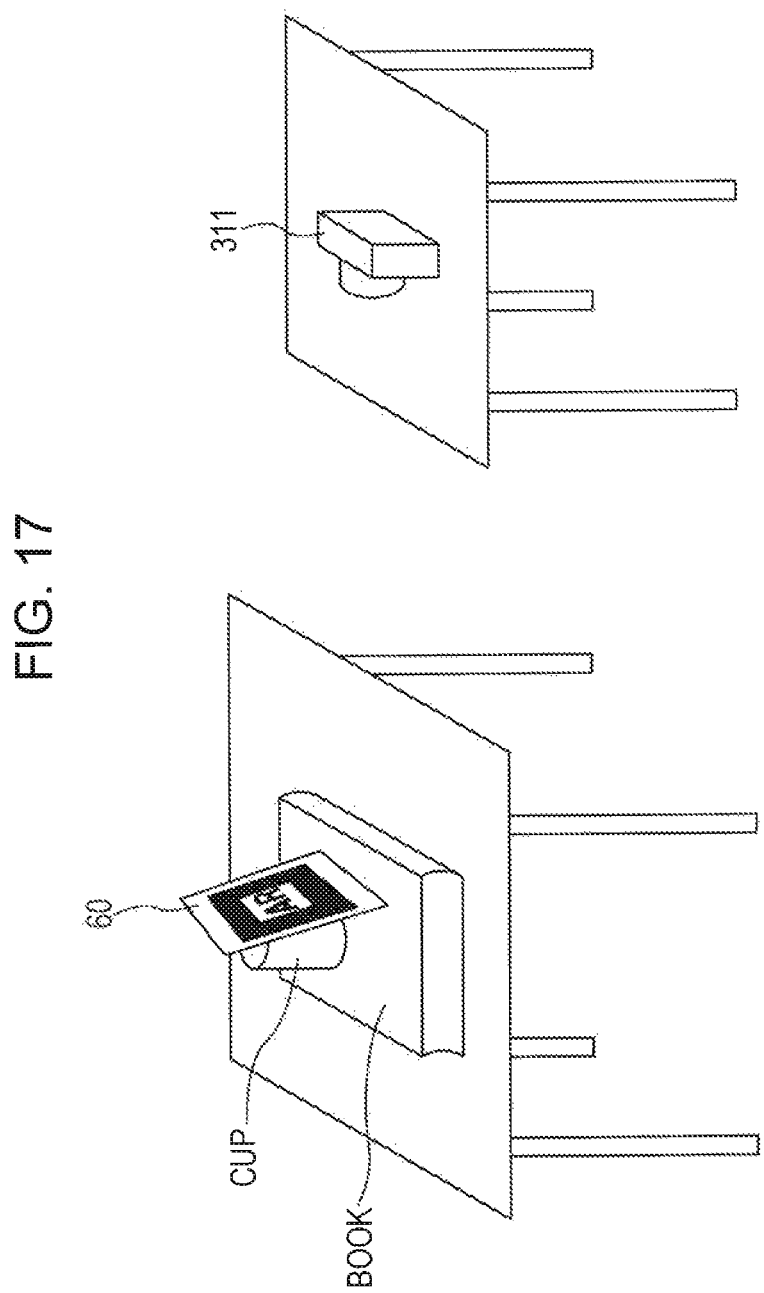
FIG. 17 is a diagram illustrating an arrangement example in which the marker is able to be freely moved or rotated.

Meanwhile, when the marker or the like is used, the placement of the marker on a table causes the marker not to be likely to be rotated around the X-axis and be rotated around the Y-axis. However, as shown in FIG. 17, a book, a cup and the like are piled up on the table, and the virtual illumination body 60 leans against the cup, thereby allowing the marker to be freely moved or rotated. In addition, when paper on which the marker is printed is not able to be stood up, the paper may be attached to, for example, a hard plate or the like and then lean against the cup or the like. In addition, the plate to which the marker is attached may be gripped so as to be located at a desired position by a user, and may be held at a desired position using a tripod or the like.

In addition, the configuration of the real space information acquisition section 31 in the illumination information acquisition section 30 may vary according to the kind of virtual illumination body. When a planar marker is used as the virtual illumination body, the acquisition of the captured image of the marker as information of the real space can cause the illumination information to be generated according to the three-dimensional position, direction or the like of the marker in the real space by performing the processes as described above. However, when the virtual illumination body is a toy shown in (D) of FIG. 7, it is different to discriminate the three-dimensional position, direction or the like of the toy in the real space using the same processes as in the case of the marker. Consequently, when the virtual illumination body has a feature in the three-dimensional shape, the real space information acquisition section 31 has a configuration in which, for example, a depth acquisition section and a feature point detection section are used. The depth acquisition section is configured using the imaging section that acquires three-dimensional information such as, for example, a stereo camera, a multi-view camera, an image sensor using a TOF (Time-of-Flight) method, or a 3D scanner using a structured light method. The depth acquisition section generates a depth map of the virtual illumination body in the real space, using the imaging section that acquires the three-dimensional information. The feature point detection section detects a feature point of the virtual illumination body in the real space from the image of the real space. When the real space information acquisition section 31 is configured in this manner, a method to which the illumination information generation processing section 35 is applied also varies depending on the configuration of the real space information acquisition section 31. For example, the illumination information generation processing section 35 performs feature point matching using the feature point of the virtual illumination body in the real space which is obtained from the feature point detection section of the real space information acquisition section 31 and the feature point of the virtual illumination body which is stored in advance, and recognizes the virtual illumination body from the image of the real space. Thereafter, the illumination information generation processing section 35 detects the three-dimensional position, direction or the like of the virtual illumination body in the real space from the recognized virtual illumination body and the depth map, and generates illumination information on the basis of a detection result.

According to the first embodiment, the illumination information is acquired on the basis of the virtual illumination body within the real space, and the image of the subject under an illumination environment based on the illumination information is generated from the illumination information and the subject information associated with illumination of the subject. In this manner, since the illumination information is acquired on the basis of the virtual illumination body within the real space, it is possible to intuitively ascertain an illumination position, an illumination direction or the like on the basis of the position, direction or the like of the virtual illumination body, that is, an object which is regarded as an illumination apparatus. Therefore, it is possible to easily perform the setting of an illumination environment when a subject image under a desired illumination environment is generated.

3. Second Embodiment of Illumination Information Acquisition Section

Incidentally, in the first embodiment, a case where an object having the reference feature quantity previously stored therein is used as the virtual illumination body has been described, whereas in a second embodiment, a case where any object is used as the virtual illumination body will be described.

In the second embodiment, learning is performed using a subject which is used as the virtual illumination body, and a feature quantity indicating a learning result is stored in a memory or the like. In addition, the virtual illumination body is recognized using the feature quantity which is stored in the memory or the like.

Figure 18:
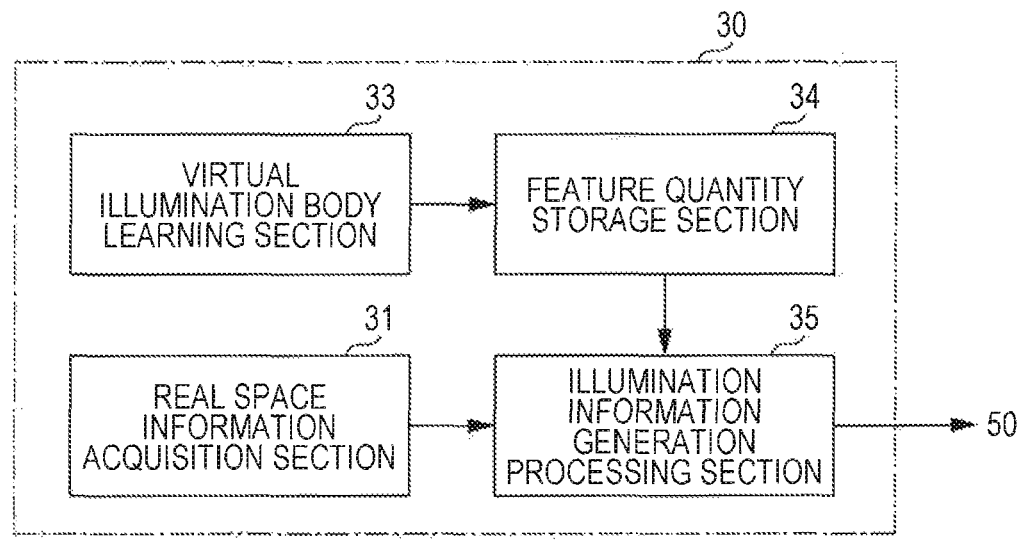
FIG. 18 is a diagram illustrating a configuration of a second embodiment of the illumination information acquisition section.

FIG. 18 illustrates a configuration of the second embodiment of the illumination information acquisition section. The illumination information acquisition section 30 includes a real space information acquisition section 31, a virtual illumination body learning section 33, a feature quantity storage section 34 and an illumination information generation processing section 35.

The real space information acquisition section 31 acquires information of the real space in which the virtual illumination body is placed and outputs the acquired information to the illumination information generation processing section 35.

The virtual illumination body learning section 33 calculates a feature quantity of an object which is used as the virtual illumination body, and stores the calculated feature quantity in the feature quantity storage section 34. Meanwhile, a feature quantity relating to the virtual illumination body which is set in advance may be stored in the feature quantity storage section 34.

The illumination information generation processing section 35 detects the virtual illumination body from real space information which is acquired by the real space information acquisition section 31, on the basis of the feature quantity which is stored in the feature quantity storage section 34, and outputs illumination information of the detected virtual illumination body to the image generation section 50.

Figure 19:
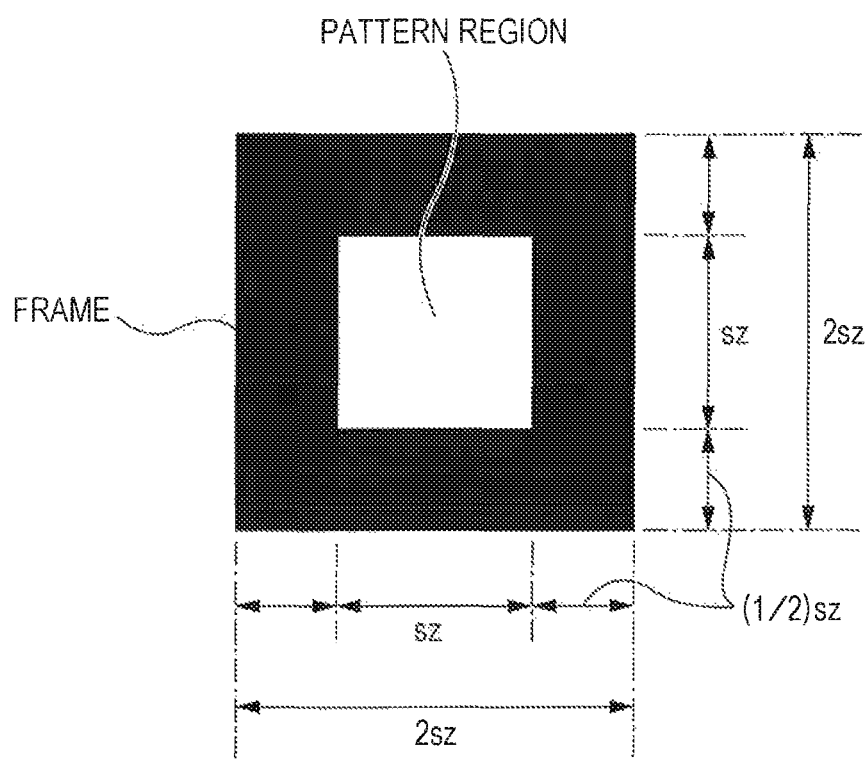
FIG. 19 is a diagram illustrating a marker which is used in learning.

Hereinafter, a case where a marker is used as the virtual illumination body which is used for learning will be described. The marker which is used for learning is square with a predetermined size (2sz*2sz), for example, as shown in FIG. 19, and is provided with a black frame having a width of "sz (for example, sz=40 mm)". In addition, using the inside of the black frame as a pattern region, a marker is created by writing alphabets, characters, or figures in the pattern region.

The virtual illumination body learning section 33 creates a feature quantity, for example, a pattern file from the captured image of the marker. FIGS. 20A to 20E are diagrams illustrating a learning operation. The virtual illumination body learning section 33 acquires the captured image of the created marker. FIG. 20A illustrates a captured image. The virtual illumination body learning section 33 performs projective transformation so that the marker of the acquired captured image has a shape in a case of image capture from the front, and creates a front-view image of the marker as shown in FIG. 20B. The virtual illumination body learning section 33 deletes a frame region from the front-view image, and extracts an image of the pattern region. FIG. 20C illustrates an image of the pattern region. The virtual illumination body learning section 33 divides the image of the pattern region with a predetermined resolution. FIG. 20D illustrates a case when the image of the pattern region is divided into blocks of 8*8. Further, the virtual illumination body learning section 33 digitizes an image for each block and generates a pattern file. Meanwhile, FIG. 20E illustrates pattern data.

Next, the creation of the front-view image will be described. The two-dimensional image coordinate system of the captured image is defined as shown in FIG. 11. The virtual illumination body learning section 33 acquires coordinates of points of four corners of the square marker from the captured image. Here, the coordinates of the points of the four corners are set to, for example, $(u_1, v_1)$, $(u_2, v_2)$, $(u_3, v_3)$, and $(u_4, v_4)$. In addition, the length of a shortest side of the four sides of the marker is defined as "1", a homography matrix is obtained in which the points of four corners having the acquired coordinates are projectively transformed into points of four corners of the square having a size of "1". Meanwhile, coordinates after the projective transformation of the points of the four corners of the marker are set to $(-\frac{1}{2}, \frac{1}{2})$, $(\frac{1}{2}, \frac{1}{2})$, $(\frac{1}{2}, -\frac{1}{2})$, and $(-\frac{1}{2}, -\frac{1}{2})$, respectively.

The homography matrix is set to a matrix of 3*3 as shown in Expression (7) described above.

Expressions by which each point of the marker is projectively transformed from the captured image to the front-view image are represented by Expressions (24) to (27) using the homography matrix. In this case, the relation of $h_33=1$ is established.

[Math. 9]

$$\begin{pmatrix} -\frac{l}{2} \\ \frac{l}{2} \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_1 \\ v_1 \\ 1 \end{pmatrix} \quad (24)$$

$$\begin{pmatrix} \frac{l}{2} \\ \frac{l}{2} \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_2 \\ v_2 \\ 1 \end{pmatrix} \quad (25)$$

$$\begin{pmatrix} \frac{l}{2} \\ -\frac{l}{2} \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_3 \\ v_3 \\ 1 \end{pmatrix} \quad (26)$$

$$\begin{pmatrix} -\frac{l}{2} \\ -\frac{l}{2} \\ 1 \end{pmatrix} = \begin{bmatrix} h_{11} & h_{12} & h_{13} \\ h_{21} & h_{22} & h_{23} \\ h_{31} & h_{32} & 1 \end{bmatrix} \begin{pmatrix} u_4 \\ v_4 \\ 1 \end{pmatrix} \quad (27)$$

The virtual illumination body learning section 33 creates the front-view image by calculating eight variables of the homography matrix from twelve equations of Expressions (24) to (27), performing projective transformation of the captured image using the calculated homography matrix, and extracting an image of the marker from an image after the projective transformation.

Figure 21:
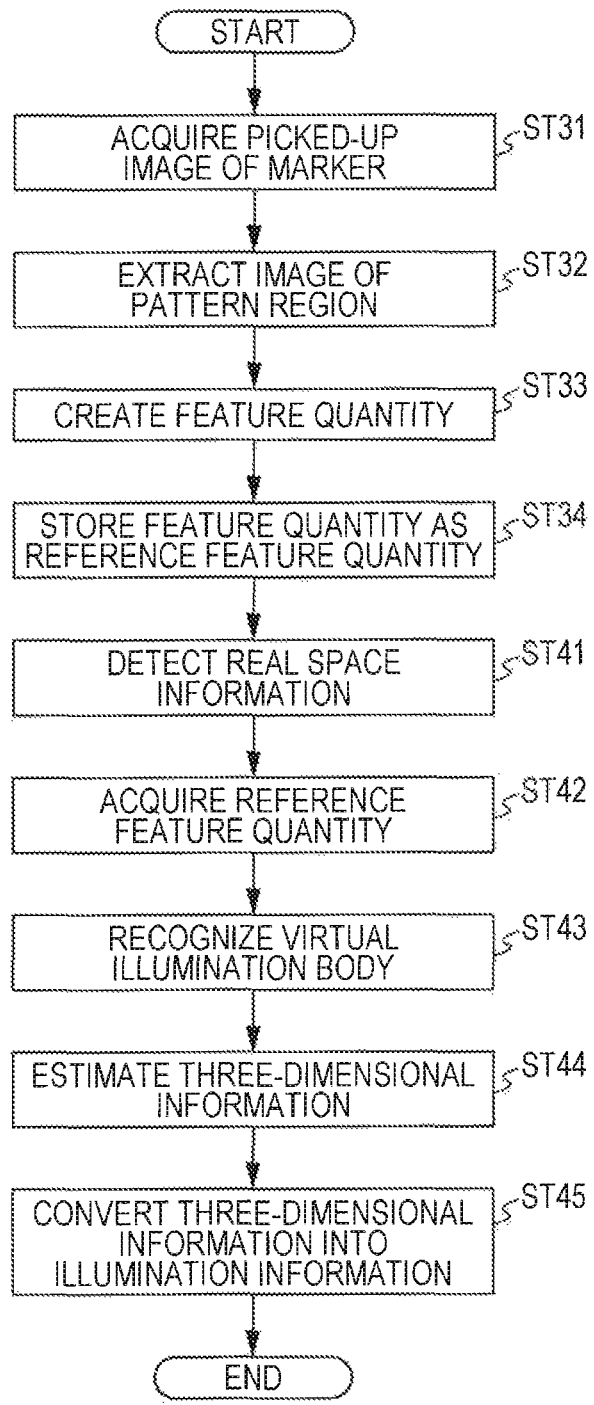
FIG. 21 is a flow diagram illustrating operations of the second embodiment.

FIG. 21 is a flow diagram illustrating operations of the second embodiment. In step ST31, the illumination information acquisition section 30 acquires the captured image of the marker. The illumination information acquisition section 30 acquires the captured image of the marker which is used as the virtual illumination body, and the process proceeds to step ST32.

In step ST32, the illumination information acquisition section 30 extracts the image of the pattern region. The illumination information acquisition section 30 performs projective transformation so that the marker of the acquired captured image has a shape in a case of image capture from the front, deletes a frame region from the front-view image after the projective transformation, and extracts the image of the pattern region, the process proceeds to step ST33.

In step ST33, the illumination information acquisition section 30 creates a feature quantity. The illumination information acquisition section 30 creates pattern data which is a feature quantity by dividing an image of the extracted pattern region with a predetermined resolution, and digitizing an image for each divided region, and the process proceeds to step ST34.

In step ST34, the illumination information acquisition section 30 stores the feature quantity as a reference feature quantity. The illumination information acquisition section 30 stores the created feature quantity as a reference feature quantity in a memory or the like so as to be capable of being used for collation described later, and the process proceeds to step ST41.

Processes of step of ST41 to step ST45 are the same as processes of step ST1 to step ST5 in the first embodiment.

In step ST41, the illumination information acquisition section 30 detects the real space information. The illumination information acquisition section 30 detects the information of the real space in which the virtual illumination body is placed, and the process proceeds to step ST42.

In step ST42, the illumination information acquisition section 30 acquires a reference feature quantity. The illumination information acquisition section 30 reads out the reference feature quantity which is stored in step ST34 from a memory, and the process proceeds to step ST43.

In step ST43, the illumination information acquisition section 30 performs a recognition process on the virtual illumination body. The illumination information acquisition section 30 collates the feature quantity of the pattern image in the marker region which is detected in step ST41 with the reference feature quantity which is acquired in step ST42, and discriminates a marker having a most analogous reference feature quantity.

The illumination information acquisition section 30 recognizes the marker having a most analogous reference feature quantity as the virtual illumination body, and the process proceeds to step ST44.

In step ST44, the illumination information acquisition section 30 estimates the three-dimensional information. The illumination information acquisition section 30 estimates the three-dimensional information of the virtual illumination body in the real space, and the process proceeds to step ST45.

In step ST45, the illumination information acquisition section 30 transforms the three-dimensional information into illumination information. The illumination information acquisition section 30 sets a correspondence relation between the three-dimensional information of the marker and the illumination information in advance, and transforms the three-dimensional information which is estimated in step ST44 into the illumination information which is used in the image generation section 50.

According to the second embodiment, as is the case with the first embodiment, since the illumination information is acquired on the basis of the virtual illumination body within the real space, it is possible to intuitively ascertain an illumination position, an illumination direction or the like on the basis of the position, direction or the like of the virtual illumination body, that is, an object which is regarded as an illumination apparatus. Therefore, it is possible to easily perform the setting of an illumination environment when a subject image under a desired illumination environment is generated.

In addition, in the second embodiment, it is possible to use any object as the virtual illumination body through learning. Therefore, as compared to the first embodiment in which the marker or the like specified in advance is used as the virtual illumination body, it is possible to increase the degree of freedom in the setting of an illumination environment.

4. Third Embodiment of Illumination Information Acquisition Section

Next, a third embodiment will be described. In the third embodiment, the illumination information is acquired by designating the virtual illumination body, for example, on a screen by the user without performing learning, which uses a subject as the virtual illumination body as in the second embodiment.

Figure 22:
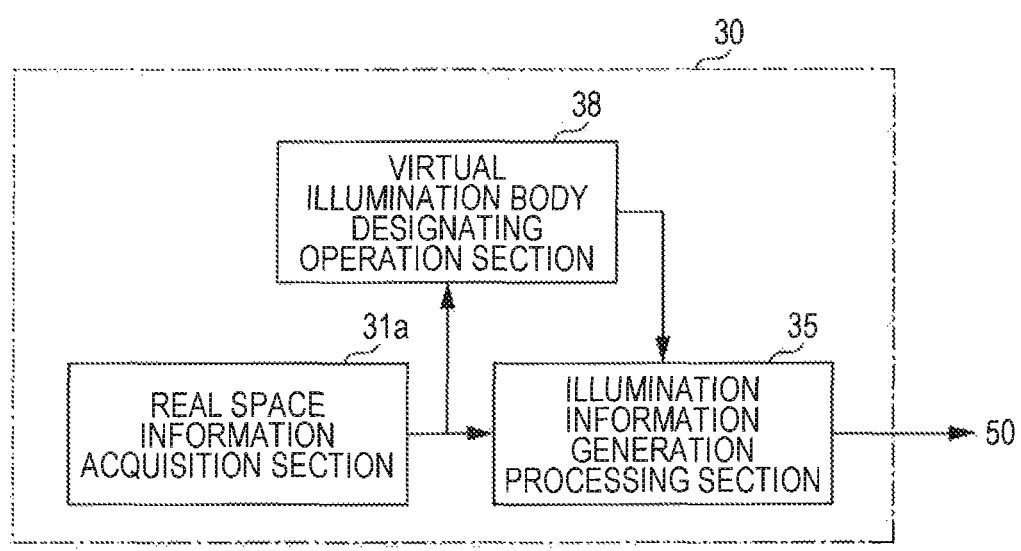
FIG. 22 is a diagram illustrating a configuration of a third embodiment of the illumination information acquisition section.

FIG. 22 is a diagram illustrating a configuration of a third embodiment of the illumination information acquisition section. The illumination information acquisition section 30 includes a real space information acquisition section 31a, the illumination information generation processing section 35, and a virtual illumination body designating operation section 38.

The real space information acquisition section 31a acquires real space information of a real space in which an object is provided, and outputs the information to the illumination information generation processing section 35 and the virtual illumination body designating operation section 38. The real space information acquisition section 31a includes an imaging section and outputs, as real space information, a captured image of the real space in which the subject is provided to the virtual illumination body detection section 312.

The virtual illumination body designating operation section 38 has a function of presenting the information of the real space to the user and a function of receiving a user's operation. For example, the virtual illumination body designating operation section 38 is configured to be provided with a touch panel on a screen of a display section or is configured to include a display section and an operation section which is capable of designating a position on the screen of the display section by using a cursor or the like. The virtual illumination body designating operation section 38 displays the information of the real space on the display section, generates an operation signal according to a designating operation of the virtual illumination body which is performed by the user according to the displayed information, and outputs the operation signal to the illumination information generation processing section 35.

The illumination information generation processing section 35 determines the virtual illumination body based on the information of the real space acquired by the real space information acquisition section 31 and the operation signal from the virtual illumination body designating operation section 38, generates the illumination information according to the determined virtual illumination body, and outputs the illumination information to the image generation section 50.

The designating operation of the virtual illumination body is performed such that a region of a quadrangular subject is designated and the designated region may be used as a region of the virtual illumination body, or such that a subject that is designated by the user, for example, a quadrangular subject or a face of a person may be used as the virtual illumination body.

Figure 23:
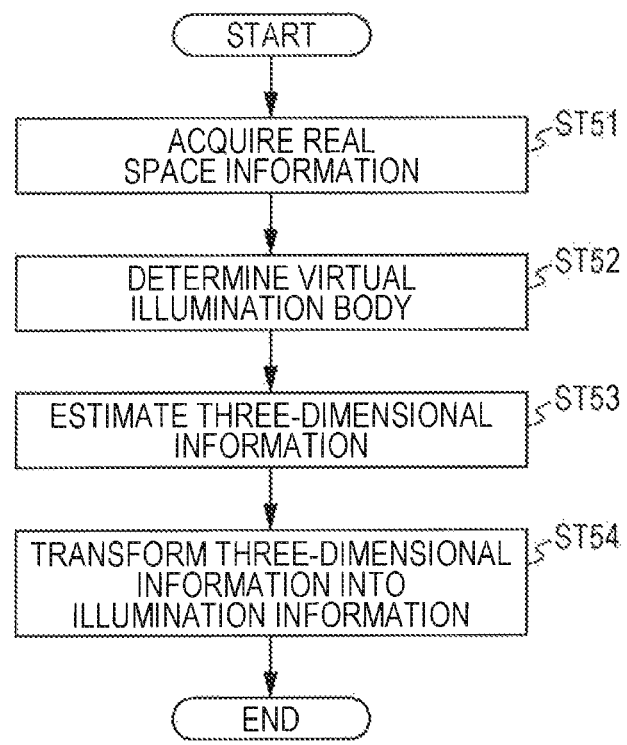
FIG. 23 is a flow diagram illustrating operations of the third embodiment.

FIG. 23 is a flow diagram illustrating operations of the third embodiment. In step ST51, the illumination information acquisition section 30 acquires the real space information. The illumination information acquisition section 30 acquires the captured image of the real space in which the subject is provided as the information of the real space and the process proceeds to step ST52.

In step ST 52, the illumination information acquisition section 30 determines the virtual illumination body. The illumination information acquisition section 30 presents the captured image, which is the acquired real space information, to the user. In addition, the illumination information acquisition section 30 determines the virtual illumination body based on the designating operation of the virtual illumination body, which is performed by the user with respect to the presented captured image, and the process proceeds to step ST53.

In step ST53, the illumination information acquisition section 30 estimates the three-dimensional information. The illumination information acquisition section 30 estimates the three-dimensional information of the virtual illumination body in the real space based on the position of the virtual illumination body in the captured image, and the process proceeds to step ST54.

In step ST54, the illumination information acquisition section 30 transforms the three-dimensional information into illumination information. The illumination information acquisition section 30 sets a correspondence relation between the three-dimensional information of the virtual illumination body and the illumination information in advance, and transforms the three-dimensional information which is estimated in step ST54 into the illumination information which is used in the image generation section 50.

In this manner, according to the third embodiment, the illumination information acquisition section acquires and presents the information of the real space in which the virtual illumination body is placed and generates the illumination information based on the information of the real space which is designated as the virtual illumination body from the presented information by the user. Accordingly, as is the case with the second embodiment, since the illumination information is generated based on the virtual illumination body in the real space, it is possible to intuitively ascertain an illumination position, an illumination direction or the like on the basis of the position, direction or the like of the virtual illumination body, that is, an object which is regarded as an illumination apparatus or a face of a person. Therefore, it is possible to easily perform the setting of an illumination environment when a subject image under a desired illumination environment is generated.

Further, in the third embodiment, since the user designates the virtual illumination body, storing the feature quantity of the virtual illumination body in advance or the learning of the virtual illumination body is not necessary. Accordingly, it is possible to enhance the convenience in the setting of the illumination environment as compared to the first embodiment in which the marker or the like specified in advance is used as the virtual illumination body and the second embodiment in which the learned marker or the like is used as the virtual illumination body.

5. Fourth Embodiment of Illumination Information Acquisition Section

Next, in a fourth embodiment, a case will be described in which illumination information is generated by using an apparatus capable of generating the three-dimensional information as the virtual illumination body.

As the virtual illumination body in the fourth embodiment, an electronic apparatus having a function of performing the generation of the three-dimensional information or the like and communication with an image processing device is used. The communication between the image processing device and the electronic apparatus may be any of wired or wireless communication. Hereinafter, a case will be described in which a portable communication terminal such as, for example, a smartphone is used as the electronic apparatus having a function of performing the generation of the three-dimensional information or the like and communication with the image processing device.

Figure 24:
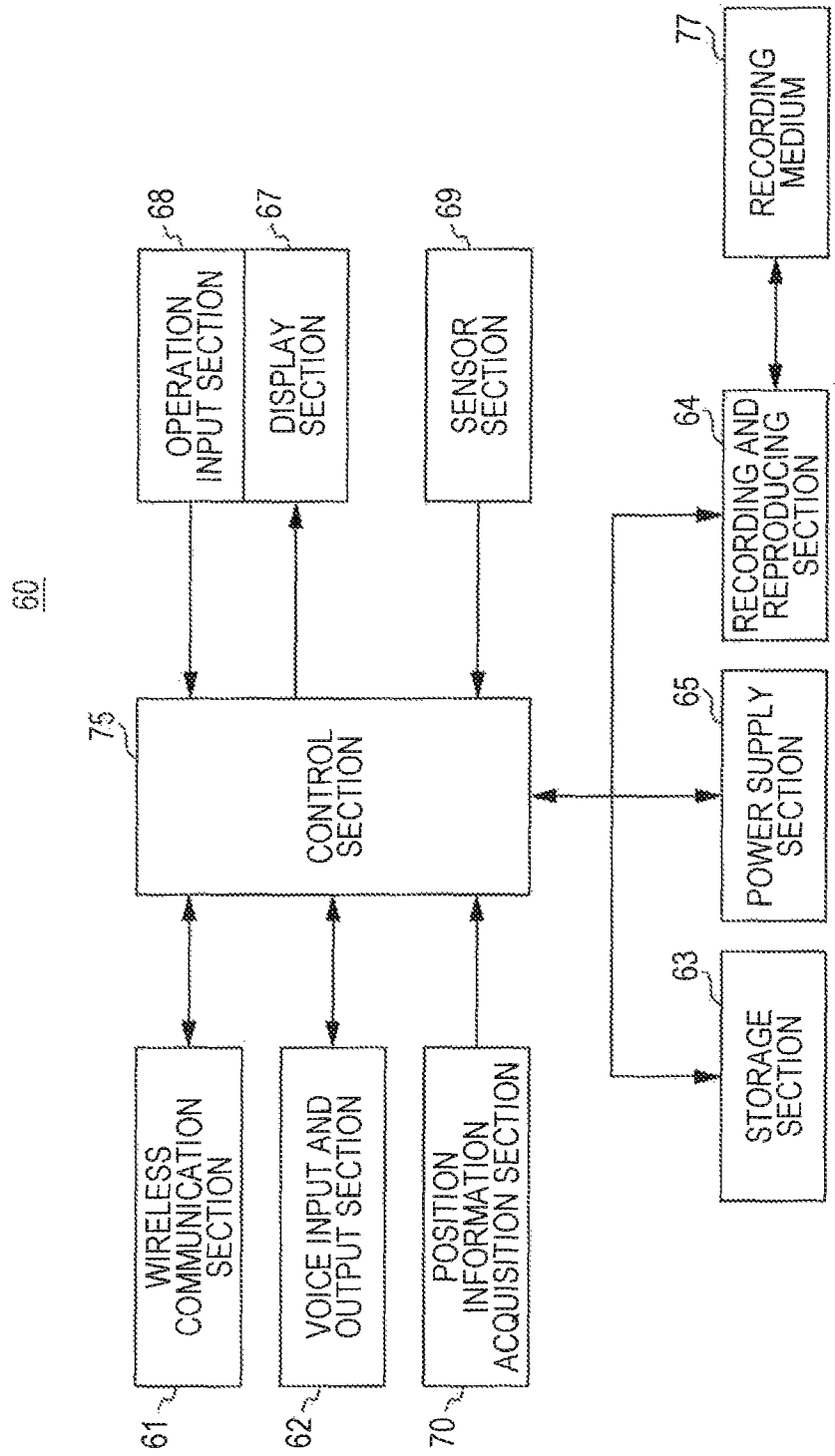
FIG. 24 is a diagram illustrating a configuration of a virtual illumination body (for example, when a smartphone is used).

FIG. 24 illustrates a configuration of the virtual illumination body (for example, when a smartphone is used). The virtual illumination body 60 includes a communication section 61, a voice input and output section 62, a storage section 63, a recording and reproducing section 64, a power supply section 65, a clocking section 66, a display section 67, an operation input section 68, a sensor section 69, a position information acquisition section 70, and a control section 75. In addition, the virtual illumination body 60 is detachably provided with a recording medium 77.

The communication section 61 performs, for example, wireless communication with an external device in accordance with control performed by the control section 75. In wireless communication, the communication section 61 performs communication corresponding to a communication standard of near field communication, for example, at least any of Bluetooth (Registered Trademark), wireless LAN, infrared communication, and the like. In addition, when the virtual illumination body is a smartphone, communication corresponding to the communication standard of a cellular phone is performed.

The voice input and output section 62 is configured using a speaker and a microphone. The voice input and output section 62 performs a voice input and output of a voice call which is performed through the communication section 61. In addition, the voice input and output section 62 outputs a reproduced sound of music contents or moving image contents which are recorded in the storage section 63 or the recording medium 77.

The storage section 63 is a recording medium such as a RAM (Random Access Memory) and a ROM (Read Only Memory). The RAM is used as, for example, a work area of the control section 75. In addition, for example, a program or the like for executing various control in the control section 75 is stored in the ROM. In addition, control information or the like which is used for performing various control in the control section 75 is stored in the ROM or the RAM. Further, music contents, moving image contents, various application programs, mail information, and the like can also be recorded in the RAM.

The recording and reproducing section 64 records various information and reads out the recorded information, using the recording medium 77. The recording and reproducing section 64 records, for example, music contents, moving image contents, captured images, mail information, others' address information which is used in wireless communication, and the like in the recording medium 77. In addition, the recording and reproducing section 64 reads out various information which is recorded in the recording medium 77.

The power supply section 65 is constituted by a battery and a power supply circuit. The power supply section 65 supplies power to each section of the virtual illumination body 60.

The display section 67 is configured using a display device such as a liquid crystal display or an organic EL display. The display section 67 displays a GUI (Graphical User Interface) screen, or characters, images and the like according to application operations through the control of the control section 75.

The operation input section 68 is configured using an operation switch or a touch panel. The touch panel is provided on a display screen of the display section 67, and is configured such that functions are allocated according to a display of the display screen. The operation input section 68 generates an operation signal according to a user's operation and outputs the generated signal to the control section 75.

The sensor section 69 is configured using an acceleration sensor or a gyro sensor. The sensor section 69 generates a sensor signal according to the parallel movement or rotation of the virtual illumination body 60 and outputs the generated signal to the control section 75.

The position information acquisition section 70 receives a positioning signal, for example, a positioning signal of a global positioning system (GPS), generates information indicating a current position of the virtual illumination body 60, and outputs the generated information to the control section 75.

The control section 75 executes a program which is recorded in the storage section 63, and generates a control signal on the basis of the operation signal which is supplied from the operation input section 68, the control information which is stored in the storage section 63, or the like. The control section 75 outputs the generated control signal to each section, and performs communication control, display control, recording and reproducing control, and the like so that an operation according to a user's operation is performed in the virtual illumination body 60. In addition, the control section 75 controls the communication section 61, and performs wireless communication with the image processing device 10. Further, the control section 75 performs a process of starting up a predetermined application program on the basis of communication with the image processing device 10, a process of generating a control signal on the basis of an operation signal after the startup of the program, and the like. In addition, the control section 75 generates three-dimensional information or illumination setting communication information including information of user's setting on the basis of a sensor signal from the sensor section 69 or a user's operation, and performs a process of transmitting the generated information to the image processing device 10, or the like.

Figure 25A:
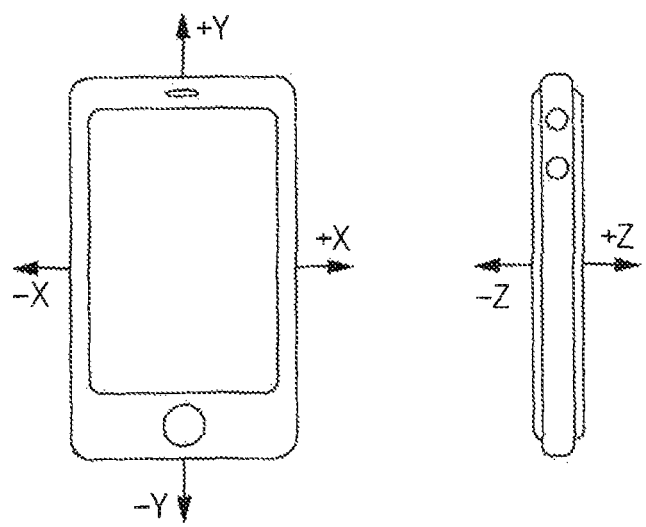
FIG. 25A is a diagram illustrating the generation of three-dimensional information in the virtual illumination body.
Figure 25B:
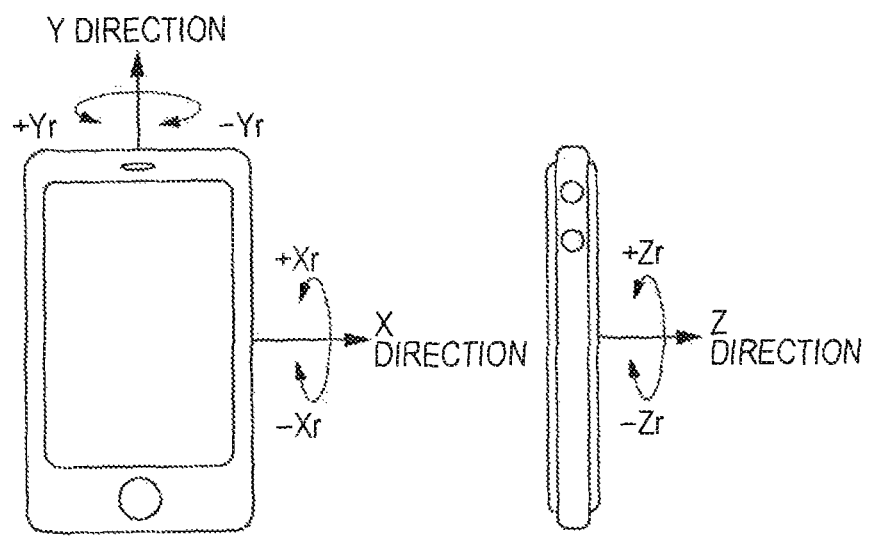
FIG. 25B is a diagram illustrating the generation of three-dimensional information in the virtual illumination body.

Here, the generation of the three-dimensional information in the virtual illumination body 60 will be described with reference to FIGS. 25A and 25B. The sensor section 69 of the virtual illumination body 60 detects the movement of the virtual illumination body 60 in an X-axis direction (+/−X direction) as shown in FIG. 25A, the movement thereof in a Y-axis direction (+/−Y direction), and the movement thereof in a Z-axis direction (+/−Z direction), for example, using an acceleration sensor, and outputs detection results to the control section 75. In addition, the sensor section 69 detects the movement of rotation (+/−Xr rotation direction) of the virtual illumination body 60, as shown in FIG. 25B, around an X direction, the movement of rotation (+/−Yr rotation direction) thereof around a Y direction, and the movement of rotation (+/−Zr rotation direction) thereof around a Z direction, for example, using a gyro sensor. The sensor section 69 outputs detection results to the control section 75. The control section 75 generates three-dimensional information indicating a position after the movement or the direction of the virtual illumination body 60 on the basis of the sensor signal from the sensor section 69. The virtual illumination body 60 sets, for example, a position and posture when the generation of the three-dimensional information is started to an initial state, and can discriminate a movement position or a change in posture from this initial state on the basis of the three-dimensional information. With such a configuration, it is possible to set the position and posture in the initial state to a predetermined position of illumination and an illumination direction during the generation of an image, to move the virtual illumination body 60 from the initial state, and to move the position of illumination during the generation of an image from the predetermined position. In addition, it is possible to change the posture of the virtual illumination body 60 from the initial state, and to change the illumination direction during the generation of an image from the predetermined direction to a new direction.

Figure 26:
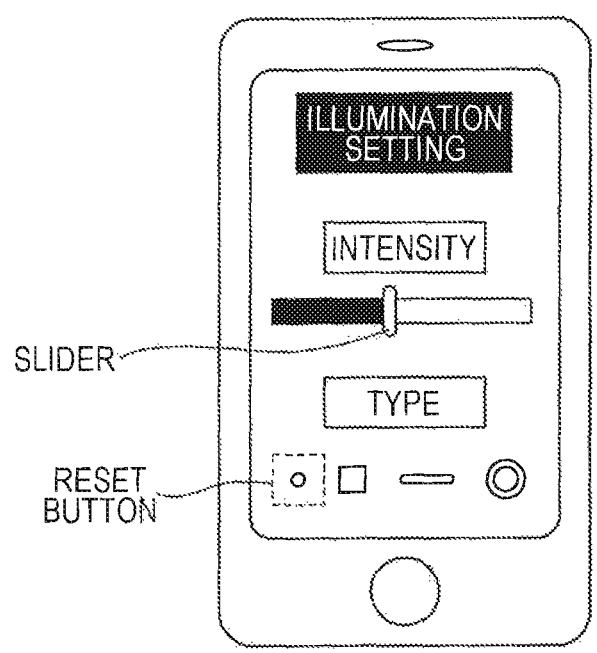
FIG. 26 is a diagram illustrating an illumination setting screen.

In addition, the virtual illumination body 60 displays an illumination setting screen for setting the intensity and type of illumination on the display section 67, and sets the intensity and type of illumination in accordance with a user's operation in the operation input section 68. FIG. 26 illustrates an illumination setting screen, and the intensity of illumination can be adjusted by a user moving a slider. In addition, the type of illumination can be specified by a user selecting a preset button for each type of, for example, a point light source, a surface light source or the like which is created in advance. The control section 75 sets intensity information or type information of illumination, which is set according to a user's operation of the illumination setting screen, to the information of user's setting. Meanwhile, the control section 75 may use intensity information or type information which is set in advance as the information of user's setting.

Figure 27:
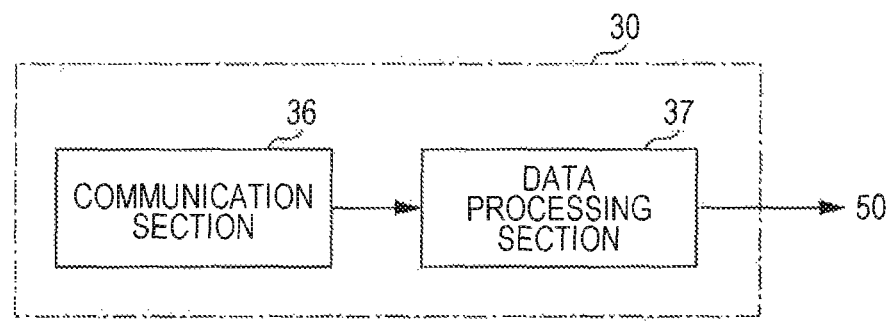
FIG. 27 is a diagram illustrating a configuration of a fourth embodiment of the illumination information acquisition section.

FIG. 27 illustrates a configuration of the fourth embodiment of the illumination information acquisition section. The illumination information acquisition section 30 includes a communication section 36 and a data processing section 37.

The communication section 36 receives a communication signal which is transmitted from the virtual illumination body 60 and outputs received data which is obtained to the data processing section 37. The data processing section 37 decodes the received data in accordance with a communication standard.

The data processing section 37 generates illumination information on the basis of the position and posture of the virtual illumination body and the change thereof which are indicated by the received data and outputs the generated information to the image generation section 50. The data processing section 37 generates illumination information for setting the position, direction, and intensity of illumination in a relighting process, on the basis of the position and posture of the virtual illumination body and the change thereof which are indicated by, for example, the illumination setting communication information included in the received data. In addition, the data processing section 37 generates illumination information for setting the intensity and type of illumination in, for example, the relighting process, on the basis of the user's setting in the virtual illumination body which is indicated by, for example, the illumination setting communication information.

Figure 28:
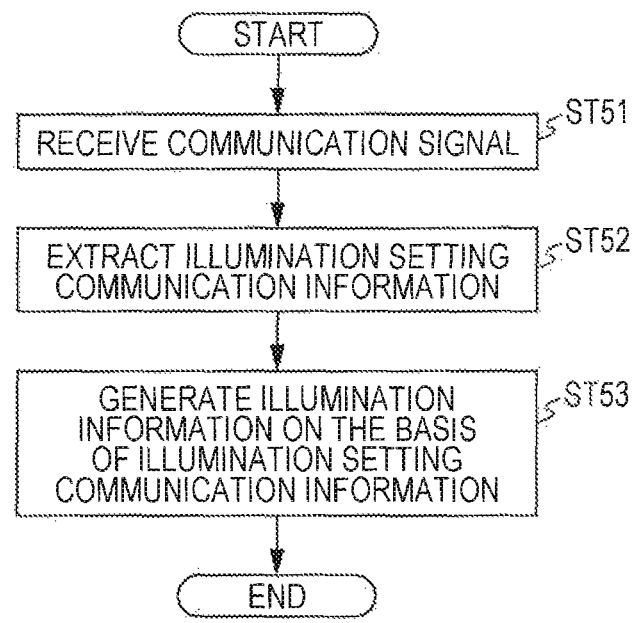
FIG. 28 is a flow diagram illustrating operations of the fourth embodiment.

FIG. 28 is a flow diagram illustrating operations of the fourth embodiment. In step ST61, the illumination information acquisition section 30 receives a communication signal. The illumination information acquisition section 30 receives the communication signal from the virtual illumination body, and the process proceeds to step ST62.

In step ST62, the illumination information acquisition section 30 extracts the illumination setting communication information. The illumination information acquisition section 30 receives a communication signal and extracts the illumination setting communication information including information indicating the three-dimensional position and direction of the virtual illumination body and the intensity and type of illumination, from the received data which is obtained, and the process proceeds to step ST63.

In step ST63, the illumination information acquisition section 30 generates illumination information on the basis of the illumination setting communication information. The illumination information acquisition section 30 generates the illumination information by causing the position and posture of the virtual illumination body which are indicated by the illumination setting communication information to correspond to the three-dimensional position and direction of illumination in, for example, the relighting process. In addition, the illumination information acquisition section 30 generates the illumination information by causing the intensity and type of illumination which are indicated by the illumination setting communication information to correspond to the intensity and type of illumination in, for example, the relighting process.

According to the fourth embodiment, as is the case with the first embodiment, since the illumination information is acquired on the basis of the virtual illumination body within the real space, it is possible to intuitively ascertain an illumination position, an illumination direction or the like on the basis of the position, direction or the like of the virtual illumination body, that is, an object which is regarded as an illumination apparatus. Therefore, it is possible to easily perform the setting of an illumination environment when a subject image under a desired illumination environment is generated.

In addition, in the fourth embodiment, the three-dimensional information or the like is supplied from the virtual illumination body to the image processing device, and in the image processing device, the position, direction or the like of illumination is set on the basis of the three-dimensional information or the like which is supplied from the virtual illumination body. Therefore, as compared to the first embodiment and the second embodiment in which the three-dimensional information or the like of the virtual illumination body is acquired from an image obtained by capturing the virtual illumination body, it is possible to easily generate the illumination information for setting an illumination environment.

Meanwhile, in the aforementioned embodiment, a case where the illumination information which is used in the generation of a relighting image is generated has been described, but the setting of illumination in the computer graphics may be performed using the illumination information which is generated as in the aforementioned embodiment.

In addition, a series of processes described in the present specification can be executed by hardware, software, or a composite configuration of both. When the processes are executed by software, a program having a process sequence recorded therein is installed in a memory within a computer incorporated into dedicated hardware and is executed. Alternatively, the program can be installed in a general-purpose computer capable of executing various types of processes and be executed.

For example, the program can be record in advance on a hard disk, a SSD (Solid State Drive), or a ROM (Read Only Memory) as a recording medium. Alternatively, the program can be temporarily or permanently be store (recorded) in a removable recording medium such as a flexible disk, a CD-ROM (Compact Disc Read Only Memory), a MO (Magneto optical) disk, a DVD (Digital Versatile Disc), a BD (Blu-Ray Disc (Registered Trademark)), a magnetic disc, or a semiconductor memory card. Such a removable recording medium can be provided as so-called package software.

In addition to being installed to a computer from such a removable recording medium, the program may be transferred from a download site through a network such as a LAN (Local Area Network) or the Internet a computer in a wireless or wired manner. In the computer, the program which is transferred in this manner can be received, and be installed on a recording medium such as a built-in hard disk.

Meanwhile, effects described in the present specification are merely illustrative and are not limited, and additional effects which are not described herein may be present. In addition, the present disclosure should not be construed to be limited to the aforementioned embodiments. In embodiments of the present disclosure, the present disclosure is disclosed in an illustrative form, and it will be obvious to those skilled in the art that modifications and substitutions of the embodiments can be made without departing from the spirit and scope of the present disclosure. That is, in order to determine the gist of the present disclosure, the appended claims should be taken into consideration.

In addition, the image processing device of the present disclosure can also take the following configurations.

(1) An image processing apparatus including:
circuitry configured to generate an image of a subject under an illumination environment based on illumination information, from subject information which is associated with illumination of the subject and from the illumination information,
wherein the illumination information is acquired on the basis of a virtual illumination body within a real space.

(2) The image processing apparatus (1), wherein the circuitry is further configured to acquire the illumination information on the basis of the virtual illumination body within the real space.

(3) The image processing apparatus of (1) or (2), wherein the illumination information is acquired on the basis of three-dimensional information of the virtual illumination body in the real space.

(4) The image processing apparatus of any of (1) to (3), further including a memory configured to store a feature quantity of the virtual illumination body, wherein the circuitry is further configured to acquire information of the real space in which the virtual illumination body is placed,
discriminate the virtual illumination body on the basis of the feature quantity which is stored in the memory and the acquired information of the real space, and
generate the illumination information on the basis of the information of the real space and the discriminated virtual illumination body.

(5) The image processing apparatus of any of (1) to (4), wherein the circuitry is further configured to acquire information of the real space in which the virtual illumination body is placed,
learn a feature quantity of the virtual illumination body, initiate a storing of the learned feature quantity into a memory, discriminate the virtual illumination body on the basis of the stored feature quantity and the acquired information of the real space, and
generate the illumination information on the basis of the information of the real space and the discriminated virtual illumination body.

(6) The image processing apparatus of any of (1) to (5), wherein the illumination information is generated on the basis of information of the real space designated as the virtual illumination body by the user from information which is presented by acquiring the information of the real space in which the virtual illumination body is placed.

(7) The image processing apparatus of any of (1) to (6), wherein the circuitry is further configured to initiate a communication with the virtual illumination body, and
receive a communication signal from the virtual illumination body and generate the illumination information on the basis of data contained within the received communication signal.

(8) The image processing apparatus of any of (1) to (7), wherein the illumination information is generated on the basis of a position and posture of the virtual illumination body and a change thereof which are indicated by the data contained within the received communication signal.

(9) The image processing apparatus of any of (1) to (8), wherein the illumination information is generated for setting a position, direction, and intensity of illumination on the basis of the position and posture of the virtual illumination body and the change thereof which are indicated by the received data.

(10) The image processing apparatus of any of (1) to (9), wherein the illumination information is generated for setting an intensity and type of illumination on the basis of user's setting in the virtual illumination body.

(11) The image processing apparatus of any of (1) to (10), wherein the illumination information includes information of at least any of a three-dimensional position of illumination, an illumination direction, an illumination intensity, and an illumination type.

(12) The image processing apparatus of any of (1) to (11), wherein the virtual illumination body is any recognizable object.

(13) The image processing apparatus of any of (1) to (12), wherein any recognizable object is provided with a rectangular frame region in a plane surface, and is a marker obtained by drawing a predetermined pattern within the frame region.

(14) An image processing method including:
generating an image of a subject under an illumination environment based on illumination information, from subject information which is associated with illumination of the subject and from the illumination information,
wherein the illumination information is acquired on the basis of a virtual illumination body within a real space.

(15) A non-transitory computer-readable medium having embodied thereon a program, which when executed by a computer causes the computer to execute an image processing method, the method including:
generating an image of a subject under an illumination environment based on illumination information, from subject information which is associated with illumination of the subject and from the illumination information,
wherein the illumination information is acquired on the basis of a virtual illumination body within a real space.

(16) An image processing device including:
an image generation section that generates an image of a subject under an illumination environment based on illumination information, from subject information which is associated with illumination of the subject and the illumination information which is acquired on the basis of a virtual illumination body within a real space.

(17) The image processing device according to (16), further comprising:
an illumination information acquisition section that acquires the illumination information on the basis of the virtual illumination body within the real space.

(18) The image processing device according to (17), wherein the illumination information acquisition section acquires the illumination information on the basis of three-dimensional information of the virtual, illumination body in the real space.

(19) The image processing device according to (17) or (18), wherein the illumination information acquisition section includes:
a real space information acquisition section that acquires information of a real space in which the virtual illumination body is placed;
a feature quantity storage section that stores a feature quantity of the virtual illumination body; and
an illumination information generation processing section that discriminates the virtual illumination body on the basis of the feature quantity which is stored in the feature quantity storage section and the information of the real space which is acquired by the real space information acquisition section, and generates illumination information on the basis of the information of the real space of the discriminated virtual illumination body.

(20) The image processing device according to any of (17) to (19), wherein the illumination information acquisition section includes:
a real space information acquisition section that acquires information of a real space in which the virtual illumination body is placed;
a virtual illumination body learning section that learns the feature quantity of the virtual illumination body;
a feature quantity storage section that stores the feature quantity which is learned in the virtual illumination body learning section; and
an illumination information generation processing section that discriminates the virtual illumination body on the basis of the feature quantity which is stored in the feature quantity storage section and the information of the real space which is acquired by the real space information acquisition section, and generates illumination information on the basis of the information of the real space of the discriminated virtual illumination body.

(21) The image processing device according to any of (17) to (20), wherein the illumination information acquisition section acquires three-dimensional information of a virtual illumination body within the real space from an imaging section.

(22) The image processing device according to any of (17) to (21), wherein the illumination information acquisition section includes an illumination information generation processing section that generates the illumination information on the basis of information of the real space designated as the virtual illumination body by the user from information which is presented by acquiring the information of the real space in which the virtual illumination body is placed.

(23) The image processing device according to any of (17) to (22), wherein the illumination information acquisition section includes:
a communication section that perform communication with the virtual illumination body; and
a data processing section that receives a communication signal from the virtual illumination body in the communication section and generates the illumination information on the basis of received data which is obtained.

(24) The image processing device according to (23), wherein the data processing section generates the illumination information on the basis of a position and posture of the virtual illumination body and a change thereof which are indicated by the received data.

(25) The image processing device according to (24), wherein the data processing section generates the illumination information for setting a position, direction, and intensity of illumination on the basis of the position and posture of the virtual illumination body and the change thereof which are indicated by the received data.

(26) The image processing device according to (24), wherein the data processing section generates the illumination information for setting an intensity and type of illumination on the basis of user's setting in the virtual illumination body.

(27) The image processing device according to any of (16) to (26), wherein the illumination information includes information of at least any of a three-dimensional position of illumination, an illumination direction, an illumination intensity, and an illumination type.

(28) The image processing device according to any of (16) to (27), wherein the virtual illumination body is any recognizable object.

(29) The image processing device according to (28), wherein the any recognizable object is provided with a rectangular frame region in a plane surface, and is a marker obtained by drawing a predetermined pattern within the frame region.

(30) The image processing device according to any of (16) to (29), further including a subject information acquisition section that acquires subject information which is associated with illumination of the subject from a captured image.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

In the image processing device and the image processing method of the present disclosure, the illumination information is acquired on the basis of the virtual illumination body within the real space, and the image of the subject under an illumination environment based on the illumination information is generated from the illumination information and the subject information associated with illumination of the subject. Therefore, the setting of an illumination environment in the generation of a subject image under a desired illumination environment can be easily performed using the position, direction or the like of the virtual illumination body which is provided within the real space. Therefore, the present disclosure is suitable for an apparatus having a function of generating a relighting image equivalent to that in a case where an image of the subject is captured under a new illumination environment.

REFERENCE SIGNS LIST

10 Image processing device
20 Subject information acquisition section
25 Subject information storage section
30 Illumination information acquisition section
31 Real space information acquisition section
32, 34 Feature quantity storage section
33 Virtual illumination body learning section
35 Illumination information generation processing section
36 Communication section
37 Data processing section
38 Virtual illumination body designating operation section
50 Image generation section
60 Virtual illumination body
311 Imaging section
312 Virtual illumination body detection section

The invention claimed is:
1. An image processing apparatus comprising:
circuitry configured to
generate an image of a subject under an illumination environment based on illumination information, from subject information which is associated with illumination of the subject and from the illumination information,
wherein the illumination information is acquired on the basis of a virtual illumination body within a real space and an illumination source which illuminates the virtual illumination body.
2. The image processing apparatus of claim 1, wherein the circuitry is further configured to
acquire the illumination information on the basis of the virtual illumination body within the real space.
3. The image processing apparatus of claim 1, wherein the illumination information is acquired on the basis of three-dimensional information of the virtual illumination body in the real space.
4. The image processing apparatus of claim 3, further comprising a memory configured to store a feature quantity of the virtual illumination body,
wherein the circuitry is further configured to
acquire information of the real space in which the virtual illumination body is placed,
discriminate the virtual illumination body on the basis of the feature quantity which is stored in the memory and the acquired information of the real space, and
generate the illumination information on the basis of the information of the real space and the discriminated virtual illumination body.
5. The image processing apparatus of claim 3, wherein the circuitry is further configured to
acquire information of the real space in which the virtual illumination body is placed,
learn a feature quantity of the virtual illumination body,
initiate a storing of the learned feature quantity into a memory, discriminate the virtual illumination body on the basis of the stored feature quantity and the acquired information of the real space, and generate the illumination information on the basis of the information of the real space and the discriminated virtual illumination body.

6. The image processing apparatus of claim 3, wherein the circuitry is further configured to initiate a communication with the virtual illumination body, and receive a communication signal from the virtual illumination body and generate the illumination information on the basis of data contained within the received communication signal.

7. The image processing apparatus of claim 6, wherein the illumination information is generated on the basis of a position and posture of the virtual illumination body and a change thereof which are indicated by the data contained within the received communication signal.

8. The image processing apparatus of claim 7, wherein the illumination information is generated for setting a position, direction, and intensity of illumination on the basis of the position and posture of the virtual illumination body and the change thereof which are indicated by the data contained within the received communication signal.

9. The image processing apparatus of claim 7, wherein the illumination information is generated for setting an intensity and type of illumination on the basis of a user's setting in the virtual illumination body.

10. The image processing apparatus of claim 1, wherein the illumination information is generated on the basis of information of the real space designated as the virtual illumination body by a user from information which is presented by acquiring the information of the real space in which the virtual illumination body is placed.

11. The image processing apparatus of claim 1, wherein the illumination information includes information of at least any of a three-dimensional position of the illumination source, an illumination direction of the illumination source, an illumination intensity of the illumination source, and an illumination type of the illumination source.

12. The image processing apparatus of claim 1, wherein the virtual illumination body is any recognizable object.

13. The image processing apparatus of claim 12, wherein any recognizable object is provided with a frame region in a plane surface, and is a marker obtained by drawing a predetermined pattern within the frame region.

14. The image processing apparatus of claim 13, wherein the frame region is rectangular.

15. The image processing apparatus of claim 1, wherein the subject information comprises reflection characteristics of the subject.

16. An image processing method comprising:

generating an image of a subject under an illumination environment based on illumination information, from subject information which is associated with illumination of the subject and from the illumination information, wherein the illumination information is acquired on the basis of a virtual illumination body within a real space and an illumination source which illuminates the virtual illumination body.

17. A non-transitory computer-readable medium having embodied thereon a program, which when executed by a computer causes the computer to execute an image processing method, the method comprising:

generating an image of a subject under an illumination environment based on illumination information, from subject information which is associated with illumination of the subject and from the illumination information, wherein the illumination information is acquired on the basis of a virtual illumination body within a real space and an illumination source which illuminates the virtual illumination body.

* * * * *